United States Patent
Trung Vo et al.

(10) Patent No.: US 12,028,658 B2
(45) Date of Patent: Jul. 2, 2024

(54) CONTENT CREATIVE INTENTION PRESERVATION UNDER VARIOUS AMBIENT COLOR TEMPERATURES

(71) Applicant: SAMSUNG ELECTRONICS CO., LTD., Suwon-si (KR)

(72) Inventors: Dung Trung Vo, Costa Mesa, CA (US); Chenguang Liu, Tustin, CA (US); Chang Su, Foothills Ranch, CA (US); McClain C. Nelson, Anaheim, CA (US); Madhu Athreya, Saratoga, CA (US); William Mandel, Moorpark, CA (US); Soojung Hyun, Tustin, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 17/807,099

(22) Filed: Jun. 15, 2022

(65) Prior Publication Data

US 2023/0039667 A1     Feb. 9, 2023

Related U.S. Application Data

(60) Provisional application No. 63/229,024, filed on Aug. 3, 2021.

(51) Int. Cl.
*H04N 9/73*     (2023.01)
*G06T 5/92*     (2024.01)
(Continued)

(52) U.S. Cl.
CPC ............... *H04N 9/73* (2013.01); *G06T 5/92* (2024.01); *H04N 9/646* (2013.01); *H04N 9/68* (2013.01)

(58) Field of Classification Search
CPC ............ H04N 9/73; H04N 9/646; H04N 9/68; H04N 1/6088; G06T 5/009; G09G 5/10;
(Continued)

(56) References Cited

U.S. PATENT DOCUMENTS 5,952,992 A    9/1999  Helms
7,791,649 B2   9/2010  Kim et al.
(Continued)

FOREIGN PATENT DOCUMENTS

EP      1942680 A2      7/2008
KR   10-1092539 B1    12/2011
(Continued)

OTHER PUBLICATIONS

International Search Report and Written Opinion dated Nov. 2, 2022 for International Application PCT/KR2022/010855, from Korean Intellectual Property Office, pp. 1-11, Republic of Korea.
(Continued)

*Primary Examiner* — Chong Wu
(74) *Attorney, Agent, or Firm* — Sherman IP LLP; Kenneth L. Sherman; Steven Laut

(57) ABSTRACT

One embodiment provides a method comprising receiving an input content, and receiving ambient contextual data indicative of one or more ambient lighting conditions of an environment including a display device. The input content has corresponding metadata that at least partially represents a creative intent indicative of how the input content is intended to be viewed. The method further comprises adaptively correcting the input content based on the ambient contextual data to preserve the creative intent, and providing the corrected input content to the display device for presentation. The adaptively correcting comprises applying automatic white balancing to the input content to correct color tone of the input content.

20 Claims, 21 Drawing Sheets
(8 of 21 Drawing Sheet(s) Filed in Color)

(51) Int. Cl.
*H04N 9/64* (2023.01)
*H04N 9/68* (2023.01)

(58) Field of Classification Search
CPC ....... G09G 2320/0276; G09G 2340/06; G09G 2360/144; G09G 2370/04; G09G 5/02
See application file for complete search history.

(56) References Cited

U.S. PATENT DOCUMENTS

| | | | |
|---|---|---|---|
| 8,218,625 | B2 | 7/2012 | Ward et al. |
| 8,223,117 | B2 | 7/2012 | Ferguson |
| 8,248,214 | B2 | 8/2012 | Moseley |
| 8,269,894 | B2 | 9/2012 | Yoon |
| 8,704,859 | B2 | 4/2014 | Greenebaum et al. |
| 9,224,363 | B2 | 12/2015 | Ballestad et al. |
| 9,478,157 | B2 | 10/2016 | Wu et al. |
| 9,530,342 | B2 | 12/2016 | Bell et al. |
| 9,947,275 | B1 | 4/2018 | Ramanath et al. |
| 10,007,412 | B2 | 6/2018 | Tao et al. |
| 10,319,268 | B2 | 6/2019 | Hartlove |
| 10,368,105 | B2 | 7/2019 | Sullivan |
| 10,733,942 | B2 | 8/2020 | Imai et al. |
| 10,847,118 | B2 | 11/2020 | Baar et al. |
| 10,924,623 | B2 | 2/2021 | Konen et al. |
| 11,074,870 | B2 | 7/2021 | Lee et al. |
| 11,227,412 | B2 | 1/2022 | Maeng et al. |
| 2008/0297816 | A1 | 12/2008 | Nikkanen et al. |
| 2008/0303918 | A1 | 12/2008 | Keithley |
| 2013/0329075 | A1* | 12/2013 | Liang .................. H04N 23/815 348/222.1 |
| 2017/0069295 | A1 | 3/2017 | Bell |
| 2018/0218710 | A1* | 8/2018 | Park .......................... G09G 5/00 |
| 2019/0188857 | A1* | 6/2019 | Rivard ....................... G06T 5/40 |
| 2020/0105221 | A1* | 4/2020 | Marcu ........................ G09G 5/02 |
| 2020/0372864 | A1* | 11/2020 | Lee ......................... G06F 1/1605 |

FOREIGN PATENT DOCUMENTS

| | | |
|---|---|---|
| KR | 10-2017-0005756 A | 1/2017 |
| KR | 10-2019-0102152 A | 9/2019 |
| KR | 10-2020-0134782 A | 12/2020 |
| KR | 10-2276575 B1 | 7/2021 |
| WO | 2007052395 A1 | 4/2009 |
| WO | 2021212072 A1 | 10/2021 |

OTHER PUBLICATIONS

Liu, C. et al. "Black Level Compensation for TVs Using HDR Dynamic Metadata," IEEE International Conference on Consumer Electronics, Jan. 7, 2022, pp. 6, IEEE, United States.

Vo, D., et al., "Creative Intent Based Ambient Compensation for HDR10+ Content Using Metadata", IEEE International Conference on Consumer Electronics, Jan. 7, 2022, pp. 4, IEEE, United States.

Baek, Y. et al., "The Effect of Ambient Lighting on the Preferred Color Temperature of Television", Proc. IS&T Int'l. Symp. on Electronic Imaging: Color Imaging XXVI: Displaying, Processing, Hardcopy, and Applications, 2021, pp. 327-1-327-5, Society for Imaging Science and Technology, United States.

Anonymous, Recommendation ITU-R BT.1886, "Reference electro-optical transfer function for flat panel displays used in HDTV studio production", Mar. 2011, pp. 7, International Telecommunication Union, Geneva.

Anonymous, Recommendation ITU-R BT.2390-8, "High dynamic range television for production and international programme exchange", Feb. 2020, pp. 59, International Telecommunication Union, Geneva.

\* cited by examiner $K = 0.03$ $K = 0.01$

CONTENT CREATIVE INTENTION PRESERVATION UNDER VARIOUS AMBIENT COLOR TEMPERATURES

CROSS-REFERENCE TO RELATED APPLICATIONS

The present application claims priority to U.S. Provisional Patent Application No. 63/229,024, filed on Aug. 3, 2021, incorporated by reference in its entirety.

TECHNICAL FIELD

One or more embodiments generally relate to consumer electronics, in particular, a method and system that automatically compensates perceptual color tone distortion of content presented on a consumer display in different ambient color temperatures.

BACKGROUND

Consumer electronic devices (e.g., smart television, smartphone, etc.) are now equipped with state-of-the-art display screens (e.g., QLED, OLED) that provide ultra-high picture quality.

SUMMARY

One embodiment provides a method comprising receiving an input content, and receiving ambient contextual data indicative of one or more ambient lighting conditions of an environment including a display device. The input content has corresponding metadata that at least partially represents a creative intent indicative of how the input content is intended to be viewed. The method further comprises adaptively correcting the input content based on the ambient contextual data to preserve the creative intent, and providing the corrected input content to the display device for presentation. The adaptively correcting comprises applying automatic white balancing to the input content to correct color tone of the input content.

Another embodiment provides a system comprising at least one processor and a non-transitory processor-readable memory device storing instructions that when executed by the at least one processor causes the at least one processor to perform operations. The operations include receiving an input content, and receiving ambient contextual data indicative of one or more ambient lighting conditions of an environment including a display device. The input content has corresponding metadata that at least partially represents a creative intent indicative of how the input content is intended to be viewed. The operations further include adaptively correcting the input content based on the ambient contextual data to preserve the creative intent, and providing the corrected input content to the display device for presentation. The adaptively correcting comprises applying automatic white balancing to the input content to correct color tone of the input content.

One embodiment provides a non-transitory processor-readable medium that includes a program that when executed by a processor performs a method. The method comprises receiving an input content, and receiving ambient contextual data indicative of one or more ambient lighting conditions of an environment including a display device. The input content has corresponding metadata that at least partially represents a creative intent indicative of how the input content is intended to be viewed. The method further comprises adaptively correcting the input content based on the ambient contextual data to preserve the creative intent, and providing the corrected input content to the display device for presentation. The adaptively correcting comprises applying automatic white balancing to the input content to correct color tone of the input content.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the nature and advantages of the embodiments, as well as a preferred mode of use, reference should be made to the following detailed description read in conjunction with the accompanying drawings, in which.

DETAILED DESCRIPTION

Figure 1:
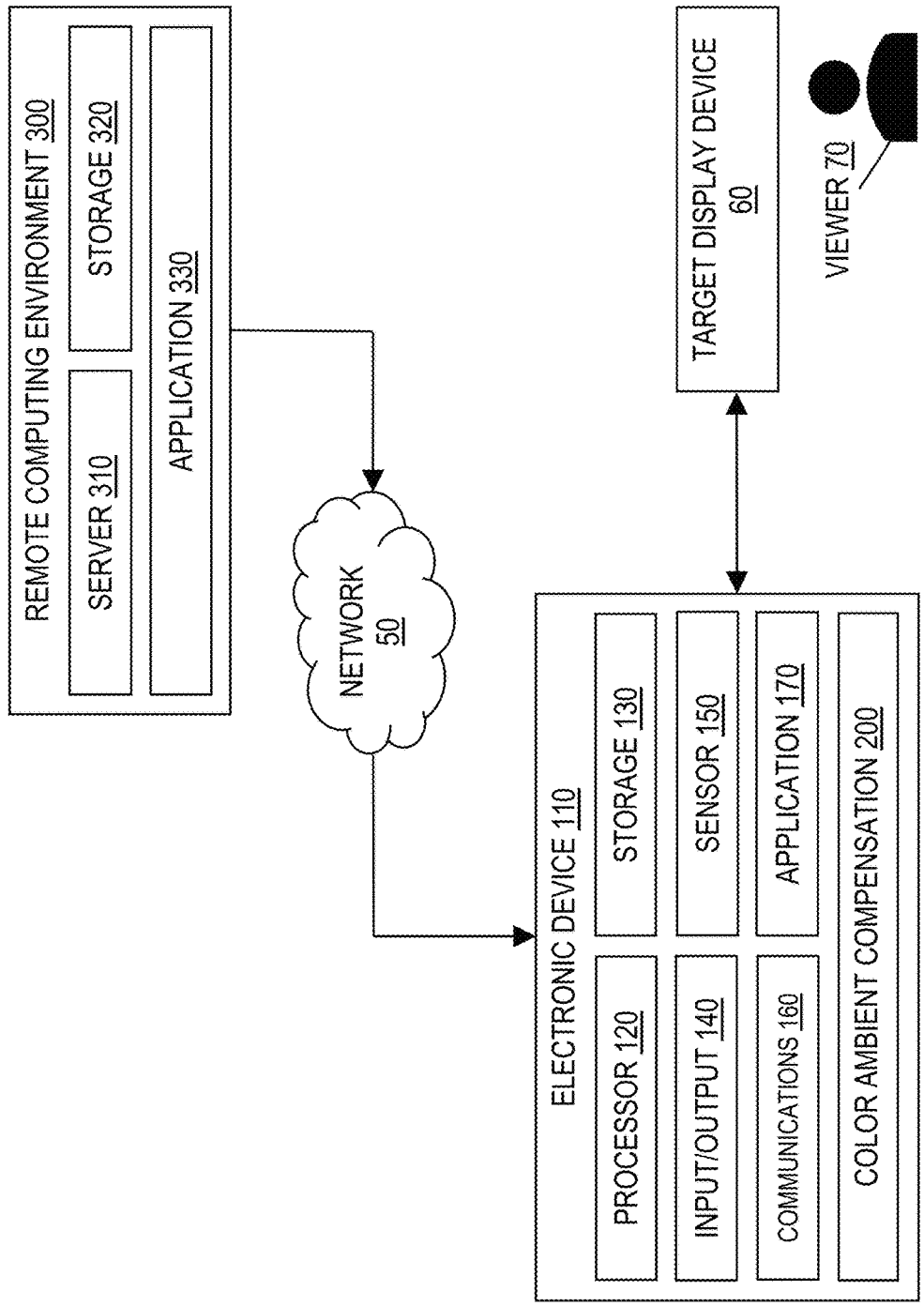
FIG. 1 illustrates an example computing architecture for implementing fully automatic color ambient compensation, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to consumer electronics, in particular, a method and system that automatically compensates perceptual color tone distortion of content presented on a consumer display in different ambient color temperatures. One embodiment provides a method comprising receiving an input content, and receiving ambient contextual data indicative of one or more ambient lighting conditions of an environment including a display device. The input content has corresponding metadata that at least partially represents a creative intent indicative of how the input content is intended to be viewed. The method further comprises adaptively correcting the input content based on the ambient contextual data to preserve the creative intent, and providing the corrected input content to the display device for presentation. The adaptively correcting comprises applying automatic white balancing to the input content to correct color tone of the input content.

Another embodiment provides a system comprising at least one processor and a non-transitory processor-readable memory device storing instructions that when executed by the at least one processor causes the at least one processor to perform operations. The operations include receiving an input content, and receiving ambient contextual data indicative of one or more ambient lighting conditions of an environment including a display device. The input content has corresponding metadata that at least partially represents a creative intent indicative of how the input content is intended to be viewed. The operations further include adaptively correcting the input content based on the ambient contextual data to preserve the creative intent, and providing the corrected input content to the display device for presentation. The adaptively correcting comprises applying automatic white balancing to the input content to correct color tone of the input content.

One embodiment provides a non-transitory processor-readable medium that includes a program that when executed by a processor performs a method. The method comprises receiving an input content, and receiving ambient contextual data indicative of one or more ambient lighting conditions of an environment including a display device. The input content has corresponding metadata that at least partially represents a creative intent indicative of how the input content is intended to be viewed. The method further comprises adaptively correcting the input content based on the ambient contextual data to preserve the creative intent, and providing the corrected input content to the display device for presentation. The adaptively correcting comprises applying automatic white balancing to the input content to correct color tone of the input content.

For expository purposes, the term "creative intent" is indicative of how an image is intended to be viewed. For example, creative intent may indicate a particular visualization of an image that a content provider or content creator (e.g., a colorist at a studio) intends for an audience to see, such as a desired/intended color tone of the image.

For expository purposes, the term "black level" generally denotes a lowest achievable luminance value of a display.

For expository purposes, the terms "tone mapping curve" and "tone mapping function" are used interchangeably in this specification.

For expository purposes, the terms "consumer display device" and "consumer display" are used interchangeably in this specification.

Content is captured in various lighting conditions, and color graded at a studio. Content is color graded (e.g., by a colorist at the studio) in a color grading environment (i.e., reference environment) with lighting conditions that include low lighting (e.g., a dark room at the studio). In the color grading environment, the content is color graded at a reference white point which typically has a color correlated temperature (CCT) of 6500K ("D65 white point"). When content is distributed and presented on a consumer display device, the content is viewed in a viewing environment (i.e., ambient environment of the consumer display device) with ambient lighting conditions that differ from the lighting conditions in which the content was color graded. There may be differences in illuminance and chromaticity between the color grading environment and the viewing environment, and the content may be viewed in the viewing environment under a non-constant viewing condition (i.e., lighting conditions of the viewing environment change over time). A non-constant viewing condition arises when daytime changes to nighttime, or when ambient lighting is turned on or off.

For example, if the viewing environment is brighter (i.e., a higher level of illuminance) than the color grading environment, a color gamut perceived by a viewer in the viewing environment shrinks, resulting in the viewer perceiving fewer colors. The brighter viewing environment also makes it harder for the viewer to perceive dark colors in dark areas of the content, as compared to in the color grading environment. As another example, the viewing environment has a white point that differs from the reference white point of the color grading environment. A reference white point of 6500K, however, may be too cool for indoor viewing environments. Studies show that an average CCT of indoor viewing environments is 3300K. As yet another example, viewing the content under a non-constant viewing condition leads to an unwanted varied visual look of the same content over time. All of the above factors result in distortion of the content perceived by the viewer comparing to the content color graded at the studio.

There may be perceived differences when comparing content presented on a reference display (i.e., reference monitor or mastering monitor) in a totally dark color grading/reference environment against the same content presented on a consumer display (e.g., a consumer TV with 6500K color ambient) in a viewing environment. For example, when comparing shadow detail, the content on the consumer display may appear darker than on the reference display if the viewing environment is brighter. As another example, when comparing color tone, the content on the reference display may appear cooler (i.e., cooler color tone) than on the consumer display. As another example, when comparing saturation, the content on the reference display may appear less saturated than on the consumer display. As another example, when comparing sharpness, the content on the reference display may appear sharper than on the consumer display if the reference display is smaller in size.

One or more embodiments provide a fully automatic color ambient compensation system that automatically compensates perceptual color tone distortion of content presented on a consumer display in different ambient color temperatures. The system dynamically corrects color tone of the content presented based on viewing conditions (e.g., ambient illuminance, ambient CCT, pixel value, etc.) of a viewing environment including the consumer display to compensate for differences between the viewing conditions of the viewing environment and viewing conditions of a color grading/reference environment in which the content is color graded, thereby preserving creative intent of a content provider/creator of the content. The system provides a fully automatic solution for color ambient compensation to preserve creative intent in a viewing environment with arbitrary viewing conditions (e.g., arbitrary ambient illuminance and arbitrary ambient CCT).

In one embodiment, the system automatically controls brightness, automatically adapts chromaticity, and/or automatically adapts a dynamic gamut in response to changes between the viewing conditions of the viewing environment and the viewing conditions of the color grading/reference environment. The system compensates for color tone, saturation, and details in viewing conditions that differ from viewing conditions of a color grading/reference environment. In one embodiment, the system utilizes a fully automatic white balancing algorithm based on a perceptual color mixing model and a luminance attenuation function (LAF).

FIG. 1 illustrates an example computing architecture 100 for implementing fully automatic color ambient compensation, in one or more embodiments. The computing architecture 100 comprises an electronic device 110 including resources, such as one or more processor units 120 and one or more storage units 130. One or more applications may execute/operate on the electronic device 110 utilizing the resources of the electronic device 110.

In one embodiment, the one or more applications on the electronic device 110 include a color ambient compensation system 200 configured to implement fully automatic color ambient compensation of content for presentation on a target display device (e.g., a high dynamic range (HDR) rendering display) 60 integrated in or coupled to the electronic device 110. As described in detail later herein, the color ambient compensation system 200 is configured to: (1) receive, as input, content (e.g., a HDR video) for presentation on the display device 60, and (2) perform color ambient compensation of the content presented on the display device 60 based on viewing conditions of a viewing environment that includes the display device 60. The display device 60 is a consumer display for viewing by a viewer 70 in the viewing environment.

In one embodiment, the content received by the system 200 has corresponding metadata including creative intent metadata indicative of creative intent of a content creator/provider of the content. In one embodiment, as part of color ambient compensation, the system 200 adaptively compensates for a black level of the display device 60, adaptively corrects a color tone of the content, and/or adaptively corrects saturation and contrast of the content to compensate for differences between the viewing conditions of the viewing environment and viewing conditions of a color grading/reference environment in which the content is color graded, thereby preserving the creative intent of the content creator/provider of the content.

In one embodiment, creative intent metadata corresponding to content comprises per frame or scene statistics information for the entire content (e.g., the entire HDR video). For example, in one embodiment, the creative intent metadata comprises, for each image (e.g., HDR image) of the content, dynamic luminance percentile information corresponding to the image. Luminance percentile information corresponding to an image represents a distribution (i.e., number) of pixels in the image.

Examples of an electronic device 110 that the display device 60 is integrated into or coupled to include, but are not limited to, a television (TV) (e.g., a smart TV), a mobile electronic device (e.g., an optimal frame rate tablet, a smart phone, a laptop, etc.), a wearable device (e.g., a smart watch, a smart band, a head-mounted display, smart glasses, etc.), a desktop computer, a gaming console, a video camera, a media playback device (e.g., a DVD player), a set-top box, an Internet of things (IoT) device, a cable box, a satellite receiver, etc.

In one embodiment, the electronic device 110 comprises one or more sensor units 150 including, but not limited to, a RGB color sensor, an IR sensor, an illuminance sensor, a color temperature sensor, etc. In one embodiment, the electronic device 110 comprises one or more additional sensor units 150 such as, but not limited to, a camera, a microphone, a GPS, a motion sensor, etc. In one embodiment, the system 200 collects, via at least one sensor unit 150 of the electronic device 110, ambient contextual data indicative of one or more viewing conditions of the viewing environment. For example, in one embodiment, the ambient contextual data includes sensor data comprising one or more readings/measurements relating to one or more display characteristics of the display device 60 (e.g., a black level of the display device 60, and a peak luminance value of the display device 60) and/or one or more ambient lighting conditions of the viewing environment (e.g., ambient illuminance, ambient CCT).

In one embodiment, at least one of the sensor units 150 is integrated in (i.e., pre-installed) or coupled (attached) to the display device 60.

In one embodiment, the electronic device 110 comprises one or more input/output (I/O) units 140 integrated in or coupled to the electronic device 110. In one embodiment, the one or more I/O units 140 include, but are not limited to, a physical user interface (PUI) and/or a graphical user interface (GUI), such as a remote control, a keyboard, a keypad, a touch interface, a touch screen, a knob, a button, a display screen, etc. In one embodiment, a user can utilize at least one I/O unit 140 to configure one or more parameters (e.g., pre-defined thresholds), provide user input, etc.

In one embodiment, the one or more applications on the electronic device 110 may further include one or more software mobile applications 170 loaded onto or downloaded to the electronic device 110, such as a camera application, a social media application, a video streaming application, etc. A software mobile application 170 on the electronic device 110 may exchange data with the system 200.

In one embodiment, the electronic device 110 comprises a communications unit 160 configured to exchange data with the display device 60. The communications unit 160 is further configured to exchange data with a remote computing environment 300 (e.g., receiving content from the remote computing environment 300), over a communications network/connection 50 (e.g., a wireless connection such as a Wi-Fi connection or a cellular data connection, a wired connection, or a combination of the two). The communications unit 160 may comprise any suitable communications circuitry operative to connect to a communications network and to exchange communications operations and media between the electronic device 110 and other devices connected to the same communications network 50. The communications unit 160 may be operative to interface with a communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the remote computing environment 300 includes resources, such as one or more servers 310 and one or more storage units 320. One or more applications 330 that provide higher-level services may execute/operate on the remote computing environment 300 utilizing the resources of the remote computing environment 300. For example, in one embodiment, the remote computing environment 300 provides an online platform for hosting one or more online services (e.g., a video streaming service, etc.) and/or distributing one or more software mobile applications 170. As another example, the system 200 may be loaded onto or downloaded to the electronic device 110 from a remote computing environment 300 that maintains and distributes updates for the system 200. As yet another example, a remote computing environment 300 may comprise a cloud computing environment providing shared pools of configurable computing system resources and higher-level services.

Figure 2:
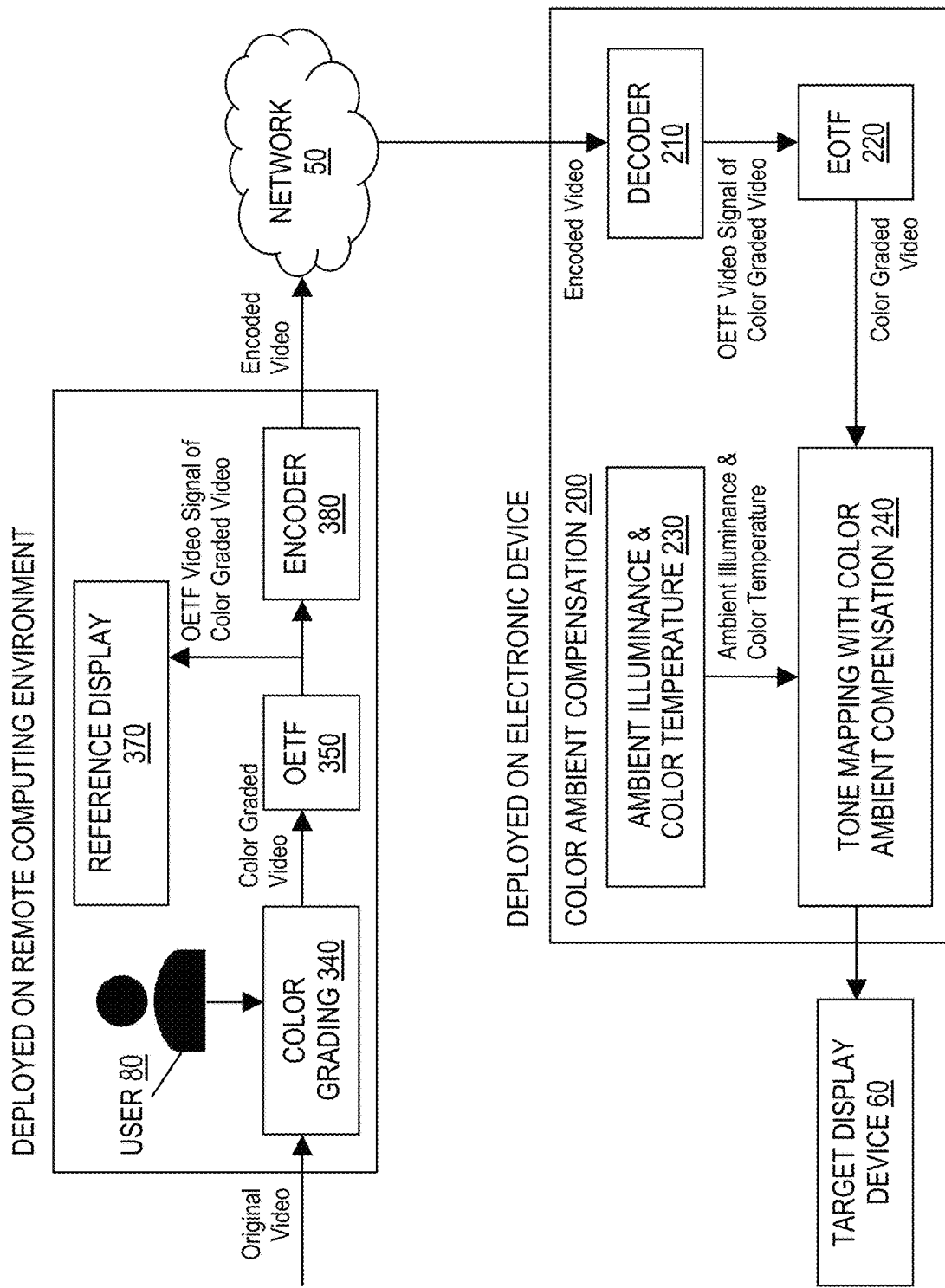
FIG. 2 illustrates an example workflow for implementing fully automatic color ambient compensation, in one or more embodiments.

FIG. 2 illustrates an example workflow for implementing fully automatic color ambient compensation, in one or more embodiments. In one embodiment, the remote computing environment 300 represents a computing environment utilized for color grading at a studio. For example, in one embodiment, the one or more applications 330 deployed on the remote computing environment 300 comprise a color grading unit 340 configured to: (1) receive content comprising an original video, and (2) perform color grading on the original video based on input from a user 80 (e.g., a colorist at the studio), resulting in a color graded video.

In one embodiment, the one or more applications 330 deployed on the remote computing environment 300 comprise an Opto Electrical Transfer Function (OETF) 350 configured to: (1) receive a color graded video (e.g., from the color grading unit 340), and (2) apply OETF to the color graded video, resulting in an OETF video signal of the color graded video.

In one embodiment, the remote computing environment 300 comprises a reference display 370 configured to: (1) receive an OETF video signal (e.g., from the OETF unit 350) of a color graded video, and (2) provide a user 80 (e.g., the colorist at the studio) with visual feedback of one or more color graded adjustments (i.e., adjustments to an original video resulting from color grading) by displaying the color graded video based on the OETF video signal.

The reference display 370 is an example reference monitor. In one embodiment, the reference display 370 is a high contrast HDR display, such as a HDR display with a peak luminance value of 4,000 nits and with a black level of zero nits ("zero black level"). The reference display 370, however, may have very high contrast compared to the display device 60. For example, the display device 60 is a consumer-grade HDR TV with a peak luminance value of about 150 nits to 750 nits and a black level of about 0.0005 nits to 0.01 nits. Without color ambient compensation, on-screen picture quality of the color graded video on the reference display 370 may be different than on-screen picture quality of the color graded video on the display device 60, thereby degrading creative intent of a content provider/content creator of the color graded video.

In one embodiment, the one or more applications 330 deployed on the remote computing environment 300 comprise an encoder unit 380 configured to: (1) receive an OETF video signal (e.g., from the OETF unit 350) of a color graded video, (2) perform encoding (e.g., H.265 codec) on the OETF video signal, and (3) provide the encoded video for transmission via the communications network 50.

In one embodiment, an encoded video provided by the encoder unit 380 is combined (e.g., via the encoder unit 380) with creative intent metadata. The creative intent metadata is automatically generated (e.g., via the color grading unit 340) or generated (e.g., via the color grading unit 340) based on input from a user 80 (e.g., a content creator at the studio). As described in detail later herein, creative intent metadata is utilized for content adapted color ambient compensation to dynamically correct picture quality of a corresponding color graded video reproduced on display devices 60 under different ambient lighting conditions, thereby preserving creative intent.

In one embodiment, the color ambient compensation system 200 comprises a decoder unit 210 deployed on the electronic device 110. In one embodiment, the decoder unit 210 is configured to: (1) receive an encoded video (e.g., from the remote computing environment 300) transmitted via the communications network 50, and (2) perform decoding on the encoded video, resulting in an OETF video signal of a color graded video. In one embodiment, creative intent metadata corresponding to the color graded video is extracted (e.g., via the decoder unit 210) from the encoded video.

In one embodiment, the color ambient compensation system 200 comprises an Electro-Optical Transfer Function (EOTF) unit 220 deployed on the electronic device 110. In one embodiment, the EOTF unit 220 is configured to: (1) receive an OETF video signal (e.g., from the decoder unit 210) of a color graded video, and (2) perform EOTF on the OETF video signal, resulting in the color graded video.

In one embodiment, the color ambient compensation system 200 comprises an ambient illuminance and color temperature unit 230 deployed on the electronic device 110. In one embodiment, the ambient illuminance and color temperature unit 230 is configured to: (1) collect sensor data from one or more sensor units 150 (FIG. 1) of the electronic device 110, and (2) determine, based on the sensor data, ambient contextual data indicative of one or more viewing conditions of a viewing environment that includes the display device 60. The viewing conditions include, but are not limited to, one or more display characteristics of the display device 60 (e.g., a black level of the display device 60, and a peak luminance value of the display device 60), and one or more ambient lighting conditions of the viewing environment. The ambient lighting conditions include, but are not limited to, ambient illuminance of the viewing environment, ambient CCT of the viewing environment, and/or color temperature of the display device 60.

In one embodiment, the color ambient compensation system 200 comprises a tone mapping with color ambient compensation system 240 deployed on the electronic device 110. In one embodiment, the tone mapping with color ambient compensation system 240 is configured to: (1) receive, as an input video, a color graded video (e.g., from the EOTF unit 220), (2) receive ambient contextual data (e.g., from the ambient illuminance and color temperature unit 230), wherein the ambient contextual data is indicative of one or more viewing conditions of a viewing environment that includes the display device 60, (3) determine a tone mapping function (i.e., tone mapping curve) that adaptively compensates for a black level of the display device 60, adaptively corrects a color tone of the input video, and/or adaptively corrects a saturation and contrast of the input video based on the viewing conditions of the viewing environment, (4) apply the tone mapping function to the input video, resulting in a tone-mapped color graded video with content adapted color ambient compensation, and (5) provide, as an output video, the tone-mapped color graded video (i.e., compensated video) to the display device 60 for presentation on the display device 60. The tone mapping function preserves creative intent of a content creator/provider of the input video as it factors into account the viewing conditions of the viewing environment.

Figure 3:
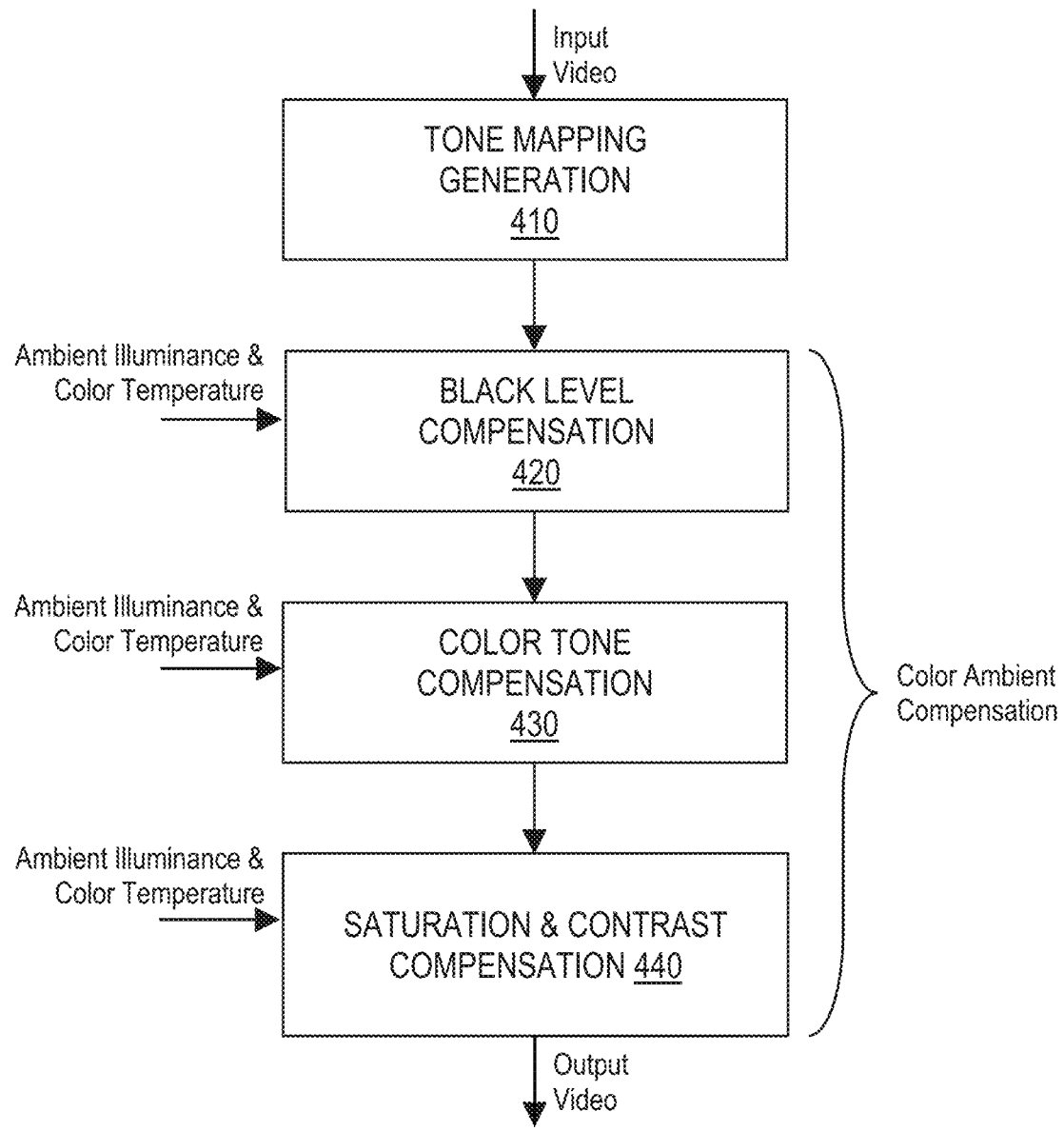
FIG. 3 illustrates an example tone mapping with color ambient compensation system, in one or more embodiments.

FIG. 3 illustrates an example tone mapping with color ambient compensation system 400, in one or more embodiments. In one embodiment, the tone mapping with color ambient compensation system 400 is deployed at an electronic device 110 that a display device 60 is integrated into or coupled to. For example, the tone mapping with color ambient compensation system 400 is integrated into, or implemented as part of, the tone mapping with color ambient compensation system 240 in FIG. 2.

In one embodiment, the tone mapping with color ambient compensation system 400 comprises a tone mapping curve generation unit 410 deployed on the electronic device 110. In one embodiment, the tone mapping curve generation unit 410 is configured to: (1) receive an input video comprising a color graded video, and (2) determine, based on metadata included with the input video, a basic tone mapping function (i.e., basic tone mapping curve) and corresponding parameters that characterize the basic tone mapping function.

In one embodiment, the basic tone mapping function is generated by the tone mapping curve generation unit 410 deployed on the electronic device 110. In another embodiment, the basic tone mapping function is generated by an application executing/operating on a remote computing environment 300 (e.g., the color grading unit 340), such that the metadata included with the input video includes the basic tone mapping function.

In one embodiment, the metadata included with the input video includes creative intent metadata indicative of creative intent of a content creator/provider of the input video.

In one embodiment, the tone mapping with color ambient compensation system 400 comprises a black level compensation unit 420 deployed on the electronic device 110. In one embodiment, the black level compensation unit 420 is configured to: (1) receive a basic tone mapping function and corresponding parameters that characterize the basic tone mapping function (e.g., from the tone mapping curve generation unit 410), (2) receive ambient contextual data indicative of one or more viewing conditions (e.g., ambient illuminance, color temperature) of a viewing environment that includes the display device 60, and (3) adaptively compensate for black level and dark details by modifying the basic tone mapping function based on the ambient contextual data (i.e., content adapted black level compensation), resulting in a first modified tone mapping function. The first modified tone mapping function improves picture quality during presentation of the input video on the display device 60 by preserving black level and dark details created by the content creator/content provider. For example, the first modified tone mapping function improves the picture quality by lifting dark details in brighter images more to prevent the dark details from becoming crushed.

In one embodiment, the tone mapping with color ambient compensation system 400 comprises a color tone compensation unit 430 deployed on the electronic device 110. In one embodiment, the color tone compensation unit 430 is configured to: (1) receive the first modified tone mapping function and corresponding parameters that characterize the first modified tone mapping function (e.g., from the black level compensation unit 420), (2) receive the ambient contextual data, and (3) adaptively compensate for color tone by modifying the first modified tone mapping function based on the ambient contextual data (i.e., content adapted color tone compensation), resulting in a second modified tone mapping function. The second modified tone mapping function improves picture quality during presentation of the input video on the display device 60 by adaptively correcting color tone of the input video, thereby preserving perceptual color tone created by the content creator/content provider. For example, the second modified tone mapping function compensates for perceptual color tone distortion resulting from differences in viewing conditions between the viewing environment and the color grading environment.

In one embodiment, the color tone compensation unit 430 applies automatic white balancing (e.g., white point compensation or perceptual model based compensation) to adaptively compensate for color tone.

In one embodiment, the tone mapping with color ambient compensation system 400 comprises a saturation and contrast compensation 440 deployed on the electronic device 110. In one embodiment, the saturation and contrast compensation 440 is configured to: (1) receive the second modified tone mapping function and corresponding parameters that characterize the second modified tone mapping function (e.g., from the color tone compensation unit 430), (2) receive the ambient contextual data, and (3) adaptively compensate for saturation and contrast by modifying the second modified tone mapping function based on the ambient contextual data (i.e., content adapted saturation and contrast compensation). The second modified tone mapping function improves picture quality during presentation of the input video on the display device 60 by adaptively correcting saturation and contrast of the input video. For example, the second modified tone mapping function compensates for saturation and contrast distortion resulting from content adapted black level compensation, content adapted color tone compensation, and/or differences in viewing conditions between the viewing environment and the color grading environment.

In one embodiment, the tone mapping with color ambient compensation system 400 is configured to generate, as an output video, a tone-mapped color graded video (i.e., compensated video) by applying the third modified tone mapping function (e.g., from the saturation and contrast compensation unit 430) to the input video.

In one embodiment, the tone mapping with color ambient compensation system 400 is configured to: (1) apply OETF to the tone-mapped color graded video, resulting in an OETF video signal of the tone-mapped color graded video, and (2) provide the OETF video signal to the display device 60 for presentation of the tone-mapped color graded video on the display device 60.

If ambient lighting conditions of the viewing environment are cooler than 6500K (i.e., D65 white point), the viewing environment has a cool ambient (i.e., cool ambient background). When the viewing environment has a cool ambient, a CCT of the viewing environment is higher than 6500K, and content presented on the display device 60 perceptually looks warmer than the same content presented on a reference monitor with a CCT of 6500K. To compensate for the warm effect from the cool ambient, the color tone compensation system 430 modifies the content presented on the display device 60 to perceptually look cooler.

If ambient lighting conditions of the viewing environment are warmer than 6500K (i.e., D65 white point), the viewing environment has a warm ambient (i.e., warm ambient background). When the viewing environment has a warm ambient, a CCT of the viewing environment is less than 6500K, and content presented on the display device 60 perceptually looks cooler than the same content presented on a reference monitor with a CCT of 6500K. To compensate for the cool effect from the warm ambient, the color tone compensation system 430 modifies the content presented on the display device 60 to perceptually look warmer.

Figure 4:
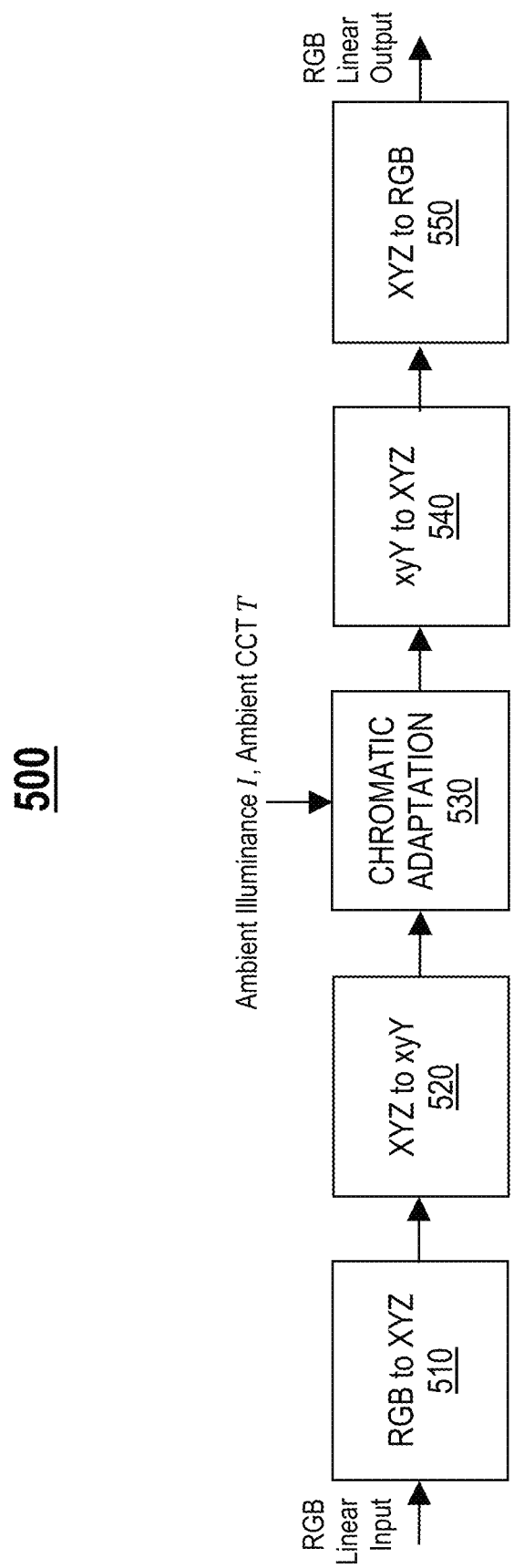
FIG. 4 is an example white point compensation system for implementing white point compensation.

FIG. 4 is an example white point compensation system 500 for implementing white point compensation, in one or more embodiments. In one embodiment, the white point compensation system 500 is deployed at an electronic device 110 that a display device 60 is integrated into or coupled to. For example, the white point compensation system 500 is integrated into, or implemented as part of, the color tone compensation system 430 in FIG. 3.

Content presented on a display device 60 under ambient lighting may have a different perceptual color tone than content presented on a reference monitor in a color grading environment. In one embodiment, the white point compensation system 500 is configured to change white point of content from an original white point (e.g., 6500K) to a compensated (i.e., modified) white point to compensate for color tone distortion resulting from differences in viewing conditions between a viewing environment and a color grading environment. Let $(x_{wp}, y_{wp})$ generally denote coordinates of an original white point in chromaticity, wherein $x_{wp}$ is an x-coordinate, and $y_{wp}$ is a y-coordinate. Let $(x_{wp'}, y_{wp'})$ generally denote coordinates of a compensated white point in chromaticity, wherein $x_{wp'}$ is an x-coordinate, and $y_{wp'}$ is a y-coordinate. The white point compensation system 500 moves the original white point $(x_{wp}, y_{wp})$ to the compensated white point $(x_{wp'}, y_{wp'})$. As described in detail later herein, the system 500 modifies the content via chromatic adaptation using the compensated white point $(x_{wp'}, y_{wp'})$ to preserve creative intent.

If the viewing environment has a cool ambient, the white point compensation system 500 is configured to further change the compensated white point $(x_{wp'}, y_{wp'})$ to a cooler white point to compensate for the warm effect from the cool ambient and preserve creative intent.

If the viewing environment has a warm ambient, the white point compensation system 500 is configured to further change the compensated white point $(x_{wp'}, y_{wp'})$ to a warmer white point to compensate for the cool effect from the warm ambient and preserve creative intent.

If the viewing environment has a cool ambient, the white point compensation system 500 moves the compensated white point $(x_{wp'}, y_{wp'})$ to a cooler white point. If the viewing environment has a warm ambient, the white point compensation system 500 moves the compensated white point $(x_{wp'}, y_{wp'})$ to a warmer white point.

The International Commission on Illumination (CIE) creates international standards related to light and color. In 1931, the CIE created the perceptually non-uniform CIE 1931 XYZ color space, which is an international standard that defines quantitative links between distributions of wavelengths in the electromagnetic visible spectrum and physiologically perceived colors in human color vision. The CIE 1931 xyY color space is derived from CIE 1931 XYZ color space.

In one embodiment, the white point compensation system 500 comprises a RGB to XYZ color space conversion unit 510 configured to: (1) receive red, green, blue (RGB) linear input, wherein the RGB linear input represents a RGB color of an input pixel of an input video in RGB space/domain, and (2) convert/transfer the RGB linear input to CIE 1931 XYZ space/domain, resulting in a first converted input color representing the input pixel in CIE 1931 XYZ space/domain.

In one embodiment, the white point compensation system 500 comprises a XYZ to xyY color space conversion unit 520 configured to: (1) receive the first converted input color representing the input pixel in CIE 1931 XYZ space/domain (e.g., from the RGB to XYZ color space conversion unit 510), and (2) convert/transfer the first converted input color to CIE 1931 xyY space/domain, resulting in a second converted input color representing the input pixel in CIE 1931 xyY space/domain.

In one embodiment, the white point compensation system 500 comprises a chromatic adaptation unit 530 configured to: (1) receive the second converted input color representing the input pixel in CIE 1931 xyY space/domain (e.g., from the XYZ to xyY color space conversion unit 520), (2) receive ambient contextual data including an ambient illuminance and an ambient CCT of a viewing environment that includes the display device 60, (3) change/move an original white point $(x_{wp}, y_{wp})$ (e.g., 6500K) of the input video to a compensated (i.e., modified) white point $(x_{wp'}, y_{wp'})$ using the ambient contextual data, and (4) change/modify a color tone of the input video by performing chromatic adaptation on the input pixel using the compensated white point $(x_{wp'}, y_{wp'})$, resulting in an output pixel in CIE 1931 xyY space/domain with a different color tone than the input pixel. The chromatic adaptation unit 530 automatically modifies a white point of the input video using a function based on ambient illuminance, ambient CCT, and a pixel value.

In one embodiment, the chromatic adaptation unit 530 determines a compensated (i.e., modified) white point $(x_{wp'}, y_{wp'})$ in accordance with equations (1)-(2) provided below:

$$x_{wp'} = x_{wp} + \Delta x_{wp} \quad (1), \text{ and}$$

$$y_{wp'} = y_{wp} + \Delta y_{wp} \quad (2),$$

wherein $\Delta x_{wp}$ and $\Delta y_{wp}$ are delta values.

In one embodiment, the chromatic adaptation unit 530 determines delta values $\Delta x_{wp}$ and $\Delta y_{wp}$ in accordance with equations (3)-(4) provided below:

$$\Delta x_{wp} = f(I,T) \quad (3), \text{ and}$$

$$\Delta y_{wp} = g(I,T) \quad (4),$$

wherein I is an ambient illuminance, T is an ambient CCT of a viewing environment that includes a consumer display (e.g., display device 60), and f and g are functions. In one embodiment, the white point compensation system 500 comprises a xyY to XYZ color space conversion unit 540 configured to: (1) receive the output pixel in CIE 1931 xyY space/domain (e.g., from the chromatic adaptation unit 530), and (2) convert/transfer the output pixel to CIE 1931 XYZ space/domain, resulting in a first converted output color representing the output pixel in CIE 1931 XYZ space/domain.

In one embodiment, the white point compensation system 500 comprises a XYZ to RGB color space conversion unit 550 configured to: (1) receive the first converted output color representing the output pixel in CIE 1931 XYZ space/domain (e.g., from the xyY to XYZ color space conversion unit 540), and (2) convert/transfer the first converted output color to RGB space/domain, resulting in a RGB linear output representing a RGB color of the output pixel in RGB space/domain.

Figure 5:
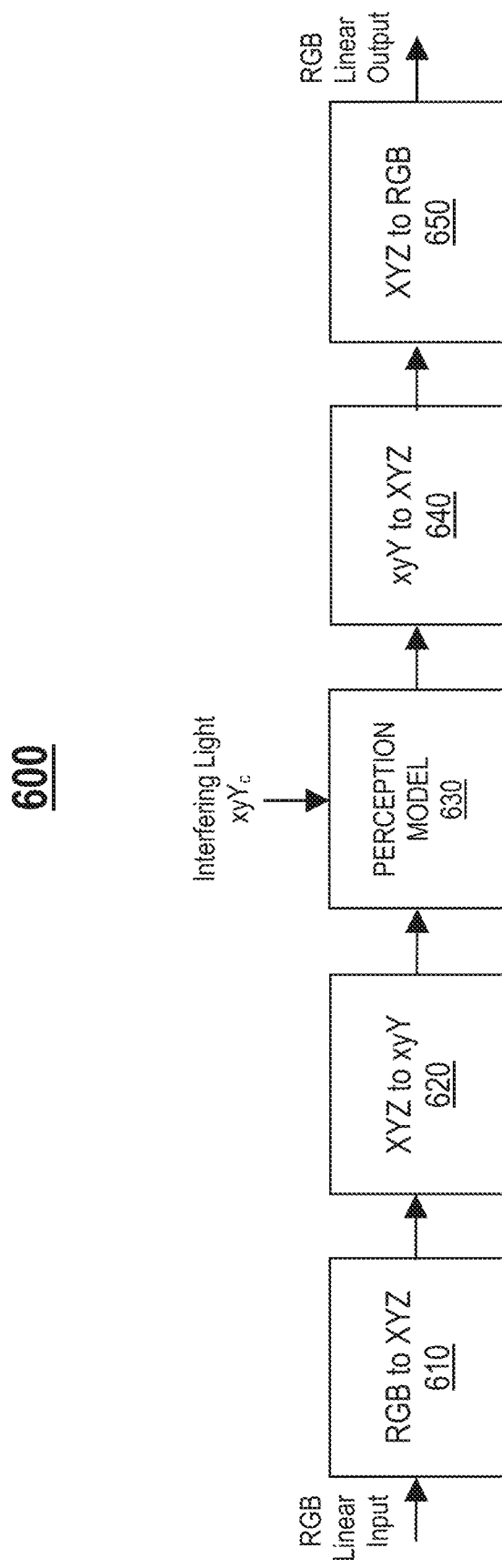
FIG. 5 is an example perception model based compensation system for implementing perception model based compensation, in one or more embodiments.

FIG. 5 is an example perception model based compensation system 600 for implementing perception model based compensation, in one or more embodiments. In one embodiment, the perception model based compensation system 600 is deployed at an electronic device 110 that a display device 60 is integrated into or coupled to. For example, the perception model based compensation system 600 is integrated into, or implemented as part of, the color tone compensation system 430 in FIG. 3.

Perception model based compensation utilizes an interfering light source model (i.e., interfering emission model or perceptual color mixing model) representing adaptation of a viewing environment that includes the display device 60. As part of perception model based compensation, color temperature of an interfering light source in the viewing environment is modeled (i.e., interfering light source modeling) to obtain the interfering light source model. For example, the color temperature of the interfering light source is modeled using a commonly used lighting system for residential use.

As part of perception model based compensation, one or more variations in brightness are modeled as one or more viewing distances between the interfering light source and an observation/viewing position of a viewer 70 in the viewing environment, resulting in a luminance attenuation function (LAF). In one embodiment, the LAF is a non-linear function designed by experiment and based on perceptual properties of human vision. For example, in one embodiment, the LAF is designed by measuring brightness of an interfering light source at multiple points along a given viewing distance, forming a look up table (LUT) comprising the measurements, and applying linear or non-linear interpolation to the LUT to obtain arbitrary values of brightness of the interfering light source.

Let $(x_m, y_m)$ generally denote coordinates of a mixed color in chromaticity ("mixed chromaticity") that is perceived by human eyes (e.g., viewer 70) on a display (e.g., display device 60), wherein $x_m$ is an x-coordinate, and $y_m$ is a y-coordinate. In one embodiment, a mixed chromaticity $(x_m, y_m)$ is determined in accordance with equations (5)-(7) provided below:

$$x_m = \frac{y_p x_I + \alpha_L y_I x_p}{\alpha_L y_I + y_p}, \quad (5)$$

$$y_m = \frac{(1+\alpha_L) y_p y_I}{\alpha_L y_I + y_p}, \text{ and} \quad (6)$$

$$\alpha_L = f_Q(L_p, L_I), \quad (7)$$

wherein $L_p$ is an ambient brightness, $(x_p, y_p)$ is an ambient chromaticity (i.e., ambient CCT), $L_i$ is a luminance of a pixel ("pixel luminance"), and $(x_I, y_I)$ is a chromaticity of the pixel ("pixel chromaticity"), and $f_Q$ is a LAF (i.e., a non-linear function designed by experiment and based on perceptual properties of human vision).

Assume content for presentation on the display device 60 has color $(L_I, x_I, y_I)$, and the viewing environment has ambient light $(L_p, x_p, y_p)$. As described in detail later herein, the perception model based compensation system 600 is configured to change/modify a pixel chromaticity $(x_I, y_I)$ to a modified pixel chromaticity $(x'_I, y'_I)$ to obtain a mixed chromaticity $(x_m, y_m)$ perceived by the viewer 70 that preserves creative intent, i.e., the mixed chromaticity $(x_m, y_m)$ perceived is the same as that perceived by a user 80 (e.g., a colorist at the studio) in a color grading environment.

In one embodiment, the perception model based compensation system 600 comprises a RGB to XYZ color space conversion unit 610 configured to: (1) receive a RGB linear input (r, g, b), wherein the RGB linear input (r, g, b) represents a RGB color of an input pixel of an input video in RGB space/domain, and (2) convert/transfer the RGB linear input to CIE 1931 XYZ space/domain, resulting in a first converted input color representing the input pixel in CIE 1931 XYZ space/domain.

In one embodiment, the perception model based compensation system 600 comprises a XYZ to xyY color space conversion unit 620 configured to: (1) receive the first converted input color representing the input pixel in CIE 1931 XYZ space/domain (e.g., from the RGB to XYZ color space conversion unit 610), and (2) convert/transfer the first converted input color to CIE 1931 xyY space/domain, resulting in a second converted input color representing the input pixel in CIE 1931 xyY space/domain. Pixel luminance and pixel chromaticity $(L_I, x_I, y_I)$ of the input pixel are obtained via the RGB to XYZ color space conversion unit 610 and the XYZ to xyY color space conversion unit 620.

In one embodiment, the perception model based compensation system 600 comprises a perception model unit 630 configured to: (1) receive the second converted input color representing the input pixel in CIE 1931 xyY space/domain (e.g., from the XYZ to xyY color space conversion unit 620), (2) receive ambient contextual data including an ambient illuminance and an ambient CCT (i.e., ambient chromaticity) $(L_p, x_p, y_p)$ of the viewing environment, and (3) perform perception model based compensation by applying an interfering light source model xyY$_c$ to change/modify an original pixel chromaticity $(x_I, y_I)$ of the input pixel to a modified pixel chromaticity $(x'_I, y'_I)$, resulting in an output pixel in CIE 1931 xyY space/domain with a different chromaticity than the input pixel. The modified pixel chromaticity $(x'_I, y'_I)$ makes a perceived color look the same as the original pixel chromaticity $(x_I, y_I)$ under ambient light $(L_p, x_p, y_p)$. If $L_p=0$, $x_m=x_I$ and $y_m=y_I$ (i.e., the perceived color is the same as an original color of the input pixel).

In one embodiment, the perception model unit 630 determines a modified pixel chromaticity $(x'_I, y'_I)$ in accordance with equations (8)-(12) provided below:

$$x_I = \frac{y_p x'_I + \alpha_L y'_I x_p}{\alpha_L y'_I + y_p}, \quad (8)$$

$$y_I = \frac{(1+\alpha_L) y_p y'_I}{\alpha_L y'_I + y_p}, \quad (9)$$

$$x'_I = x_I + \frac{\alpha_L y_I (x_I - x_p)}{\alpha_L (y_p - y_I) + y_p}, \quad (10)$$

$$y'_I = \frac{y_I y_p}{\alpha_L (y_p - y_I) + y_p}, \text{ and} \quad (11)$$

$$\alpha_L = f_Q(L_p, L_I) = \frac{K * L_p}{L_I}, \quad (12)$$

wherein K is a scaling factor.

In one embodiment, the scaling factor K is determined through experiments. As $L_p$ and $L_I$ have a linear relationship, the scaling factor K may be tuned to regulate this relationship. For example, effectiveness of perception model based compensation is more if K is larger, and vice versa.

In one embodiment, the perception model based compensation system 600 comprises a xyY to XYZ color space conversion unit 640 configured to: (1) receive the output pixel in CIE 1931 xyY space/domain (e.g., from the chromatic adaptation unit 630), and (2) convert/transfer the output pixel to CIE 1931 XYZ space/domain, resulting in a first converted output color representing the output pixel in CIE 1931 XYZ space/domain.

In one embodiment, the perception model based compensation system 600 comprises a XYZ to RGB color space conversion unit 650 configured to: (1) receive the first converted output color representing the output pixel in CIE 1931 XYZ space/domain (e.g., from the xyY to XYZ color space conversion unit 640), and (2) convert/transfer the first converted output color to RGB space/domain, resulting in a RGB linear output representing a RGB color of the output pixel in RGB space/domain. Pixel luminance and pixel chromaticity ($L_I$, $x'_I$, $y'_I$) of the output pixel are converted to a RGB color (r', g', b') of the output pixel via the xyY to XYZ color space conversion unit 640 and the XYZ to RGB color space conversion unit 650.

In one embodiment, the perception model based compensation system 600 is utilized to change/modify an original white point ($x_I$, $y_I$) of content to a modified (i.e., compensated) white point ($x'_I$, $y'_I$) (i.e., global content white point modification). Assume if an original white point of content is 6500K (i.e., D65 white point), $x_I$=0.31352, $y_I$=0.32363, and $L_I$ is an average of scene luminance (e.g., from HDR10/HDR10+ metadata or calculated from a previous frame).

Figure 6A:
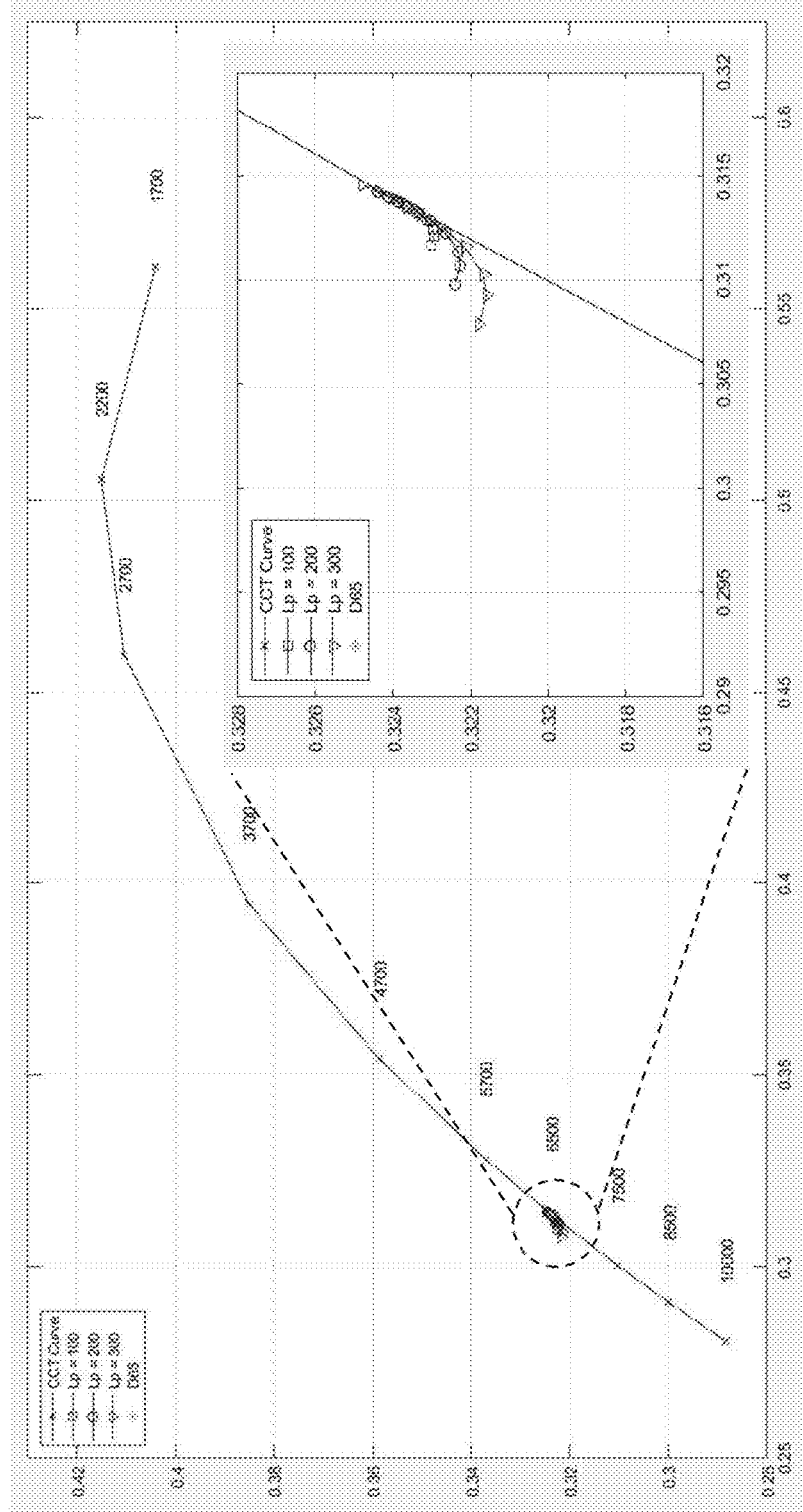
FIG. 6A is a graph illustrating example plots of a modified white point and a close-up view of the plots, in one or more embodiments.

FIG. 6A is a graph 700 illustrating example plots of a modified white point ($x'_I$, $y'_I$) and a close-up view of the plots, in one or more embodiments. A horizontal axis of the graph 700 represents a x-coordinate in chromaticity. A vertical axis of the graph 700 represents a y-coordinate in chromaticity. Assume $L_I$=5 nits, $L_p$ varies from 100 lux to 300 lux with 100 lux intervals, K=0.0015, and ambient chromaticity (i.e., ambient CCT) is set to 1700K, 2200K, 2700K, 3700K, 4700K, 5700K, 6500K, 7500K, 8500K, and 10000K, respectively. As shown by the example plots of FIG. 6A, an original white point of content is shifted to a modified (i.e., compensated) white point ($x'_I$, $y'_I$) (global content white point modification via the perception model based compensation system 600).

Figure 6B:
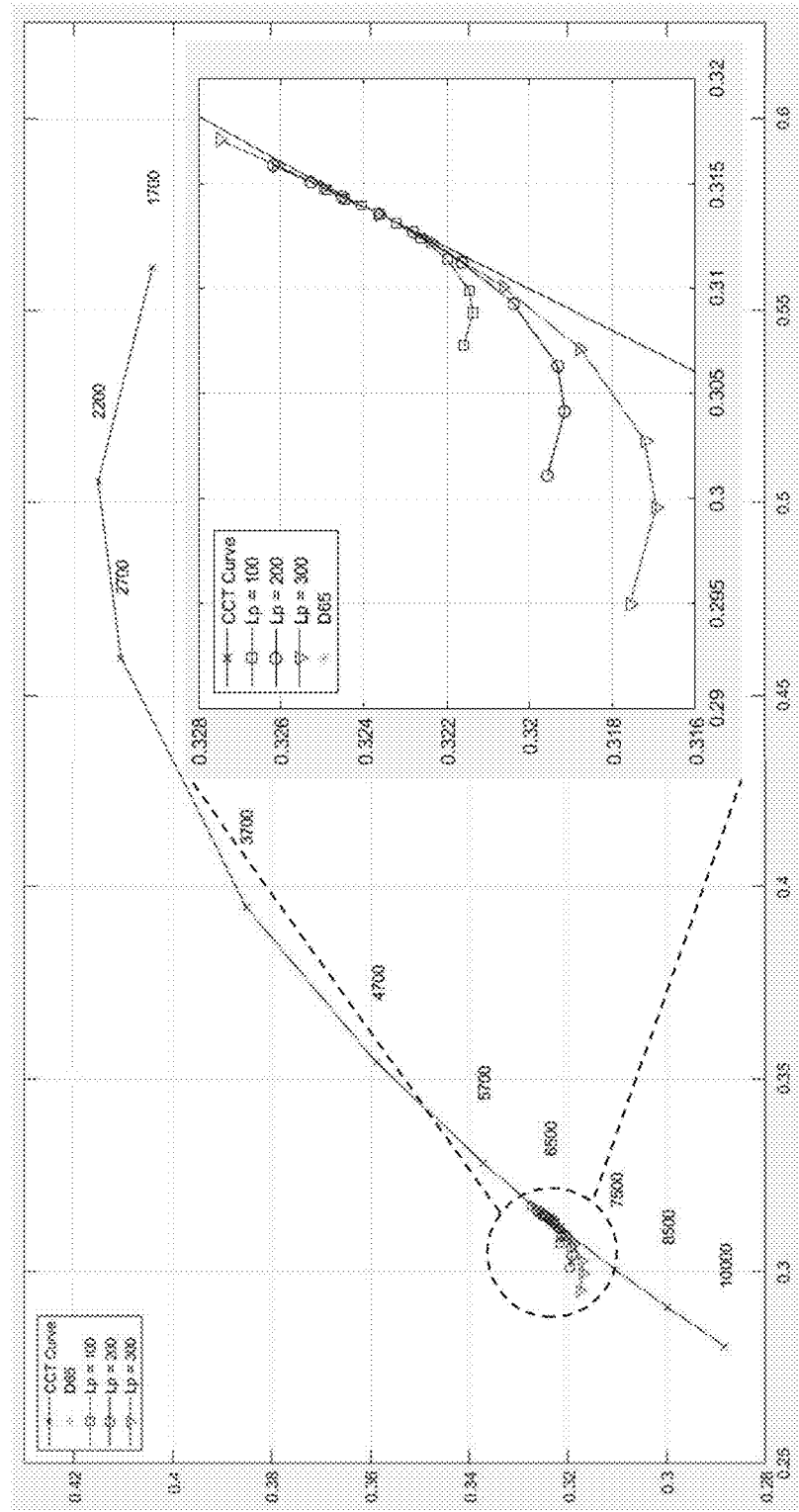
FIG. 6B is another graph illustrating example plots of a modified white point and a close-up view of the plots, in one or more embodiments.

FIG. 6B is another graph 710 illustrating example plots of a modified white point ($x'_I$, $y'_I$) and a close-up view of the plots, in one or more embodiments. A horizontal axis of the graph 710 represents a x-coordinate in chromaticity. A vertical axis of the graph 710 represents a y-coordinate in chromaticity. Assume $L_I$=5 nits, $L_p$ varies from 100 lux to 300 lux with 100 lux intervals, K=0.005, and ambient chromaticity (i.e., ambient CCT) is set to 1700K, 2200K, 2700K, 3700K, 4700K, 5700K, 6500K, 7500K, 8500K, and 10000K, respectively. As shown by the example plots of FIG. 6B, an original white point of content is shifted to a modified (i.e., compensated) white point ($x'_I$, $y'_I$) (global content white point modification via the perception model based compensation system 600).

As shown in FIGS. 6A-6B, higher levels of luminance (e.g., a warm ambient) results in more white point shifting (i.e., an original white point is shifted more), and lower levels of luminance (e.g., a cool ambient) results in a warmer modified white point. As further shown in FIGS. 6A-6B, a smaller scaling factor K (e.g., K=0.0015) results in less white point shifting, whereas a larger scaling factor K (e.g., K=0.005) results in more white point shifting.

Figure 7A:
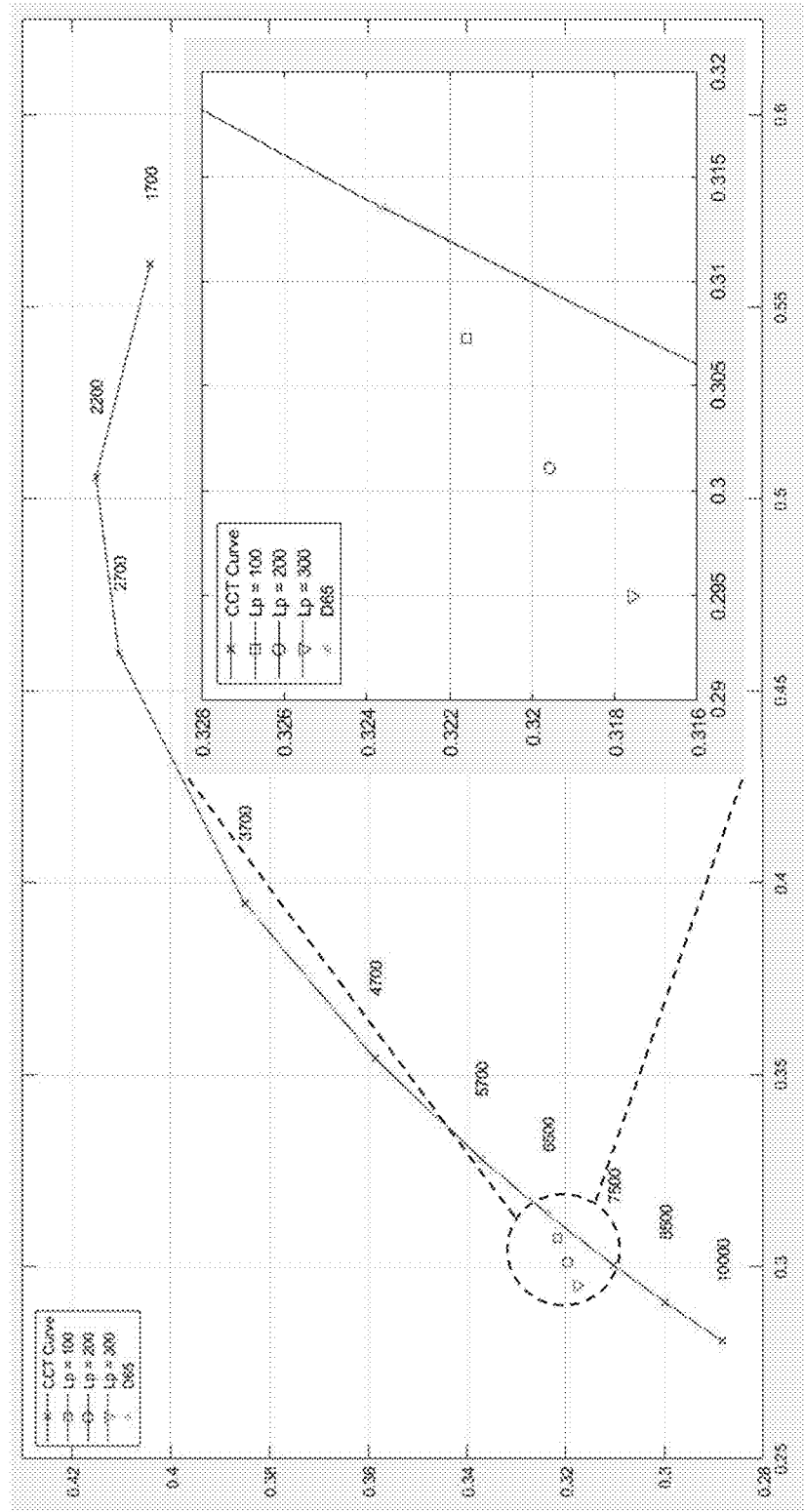
FIG. 7A is another graph illustrating example plots of a modified white point and a close-up view of the plots, in one or more embodiments.

FIG. 7A is another graph 720 illustrating example plots of a modified white point ($x'_I$, $y'_I$) and a close-up view of the plots, in one or more embodiments, in one or more embodiments. A horizontal axis of the graph 720 represents a x-coordinate in chromaticity. A vertical axis of the graph 720 represents a y-coordinate in chromaticity. Assume $L_I$=5 nits, $L_p$ varies from 100 lux to 300 lux with 100 lux intervals, K=0.005, and ambient chromaticity (i.e., ambient CCT) =1700K. As shown by the example plots of FIG. 7A, an original white point of content is shifted to a modified (i.e., compensated) white point ($x'_I$, $y'_I$) (global content white point modification via the perception model based compensation system 600).

Figure 7B:
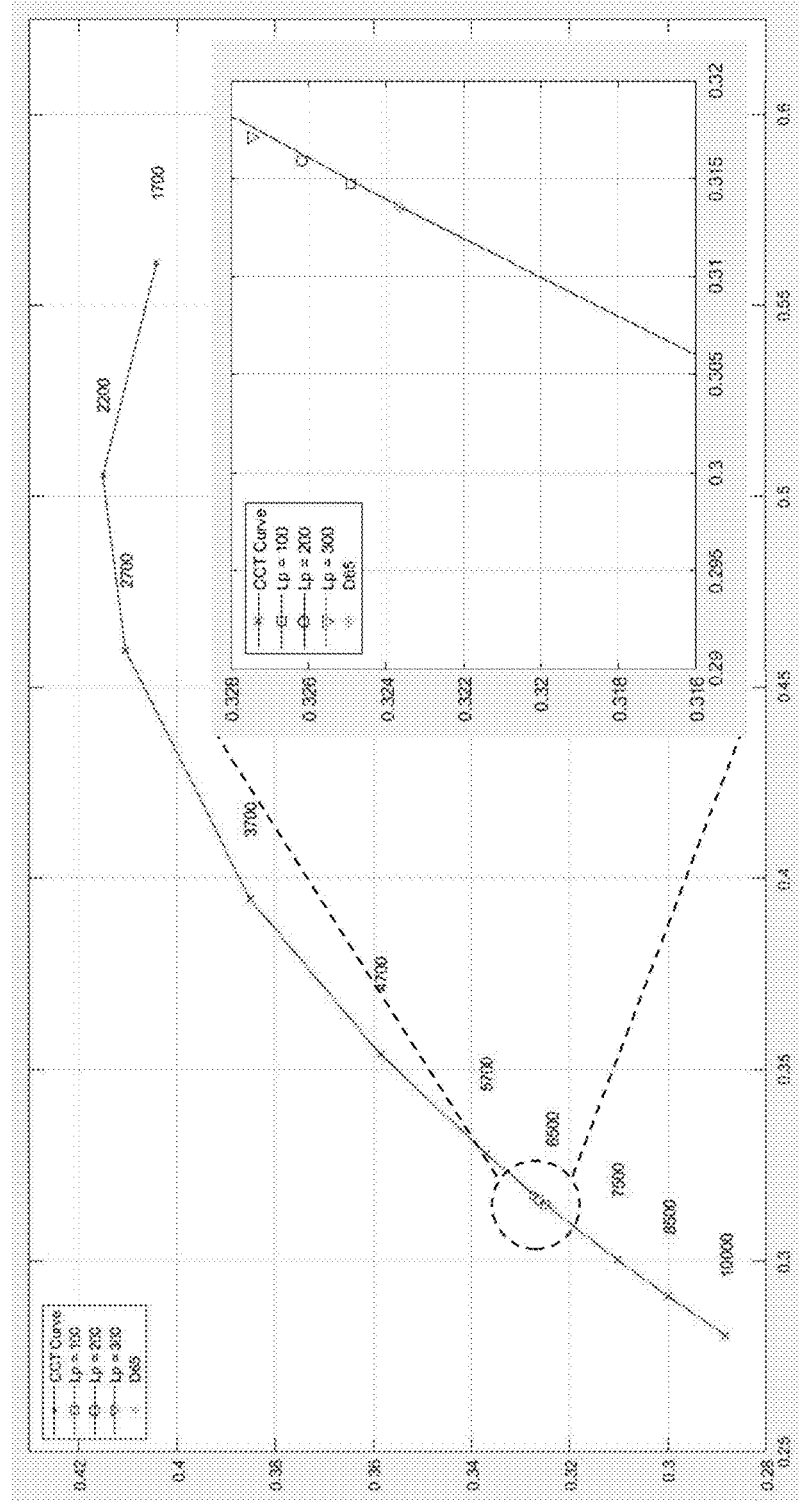
FIG. 7B is another graph illustrating example plots of a modified white point and a close-up view of the plots, in one or more embodiments.

FIG. 7B is another graph 730 illustrating example plots of a modified white point ($x'_I$, $y'_I$) and a close-up view of the plots, in one or more embodiments, in one or more embodiments. A horizontal axis of the graph 730 represents a x-coordinate in chromaticity. A vertical axis of the graph 730 represents a y-coordinate in chromaticity. Assume $L_I$=5 nits, $L_p$ varies from 100 lux to 300 lux with 100 lux intervals, K=0.005, and ambient chromaticity (i.e., ambient CCT) =10000K. As shown by the example plots of FIG. 7B, an original white point of content is shifted to a modified (i.e., compensated) white point ($x'_I$, $y'_I$) (global content white point modification via the perception model based compensation system 600).

As shown in FIGS. 7A-7B, for a positive scaling factor K, an original white point of content is shifted to a colder zone (i.e., colder modified white point) if a viewing environment has a warm ambient (e.g., ambient chromaticity (i.e., ambient CCT)=1700K), and the original white point of content is shifted to a warmer zone (i.e., warmer modified white point) instead if the viewing environment has a cold ambient (e.g., ambient chromaticity (i.e., ambient CCT)=10000K). As further shown in FIGS. 7A-7B, an original white point is shifted further away from the D65 white point as $L_p$ increases.

In one embodiment, the perception model based compensation system 600 is utilized to change/modify an original pixel chromaticity ($x_I$, $y_I$) of an input pixel of content to a modified pixel chromaticity ($x'_I$, $y'_I$) (i.e., pixel wise color tone modification). Assume for an input pixel of content, $x_I$=0.3013 and $y_I$=0.3612.

Figure 8A:
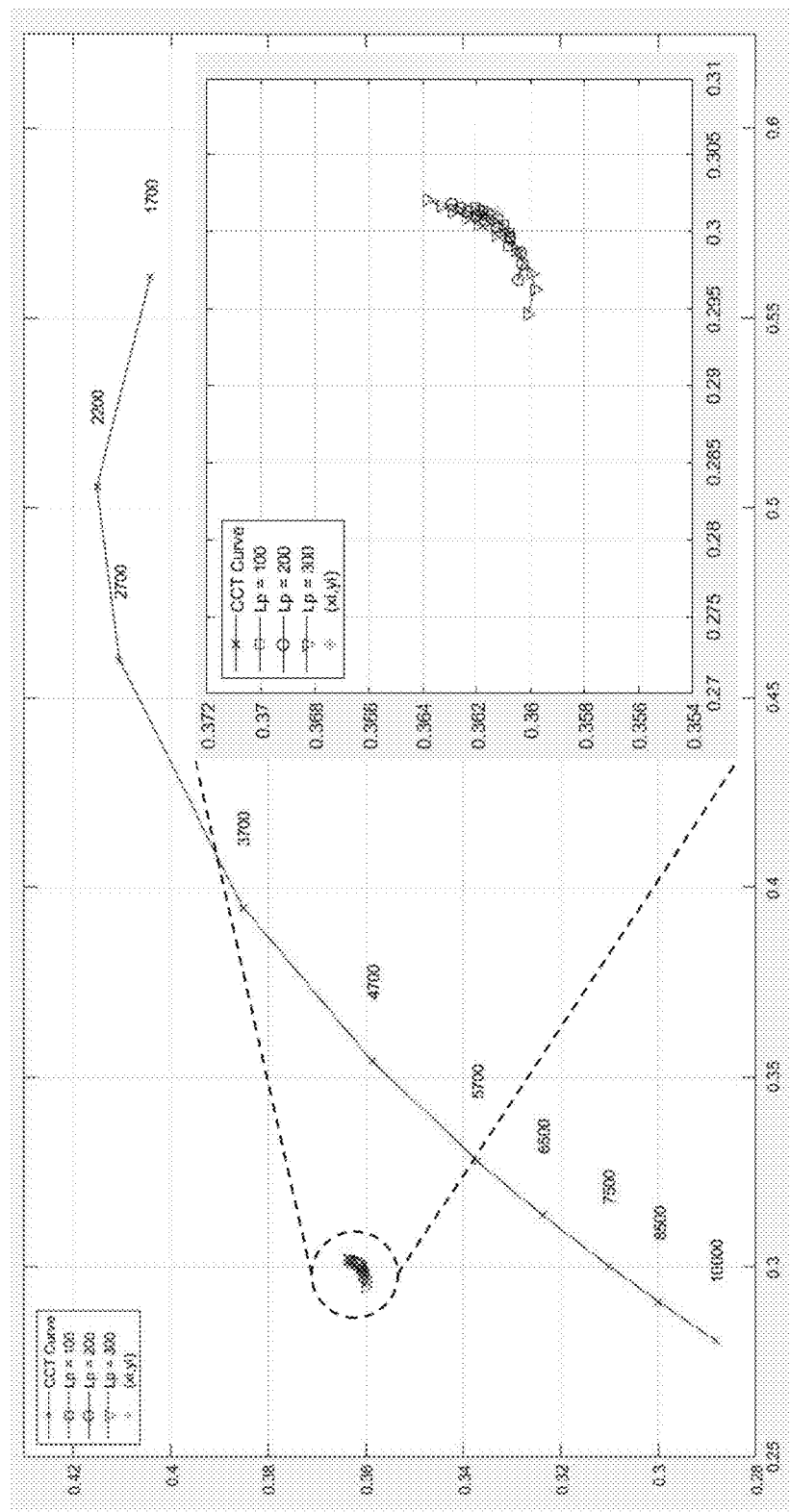
FIG. 8A is a graph illustrating example plots of a modified pixel chromaticity and a close-up view of the plots, in one or more embodiments.

FIG. 8A is a graph 740 illustrating example plots of a modified pixel chromaticity ($x'_I$, $y'_I$) and a close-up view of the plots, in one or more embodiments. A horizontal axis of the graph 740 represents a x-coordinate in chromaticity. A vertical axis of the graph 740 represents a y-coordinate in chromaticity. Assume $L_I$=5 nits, $L_p$ varies from 100 lux to 300 lux with 100 lux intervals, K=0.0015, and ambient chromaticity (i.e., ambient CCT) is set to 1700K, 2200K, 2700K, 3700K, 4700K, 5700K, 6500K, 7500K, 8500K, and 10000K, respectively. As shown by the example plots of FIG. 8A, an original pixel chromaticity of an input pixel is shifted to a modified pixel chromaticity (x'$_I$, y'$_I$) (pixel wise color tone modification via the perception model based compensation system 600).

Figure 8B:
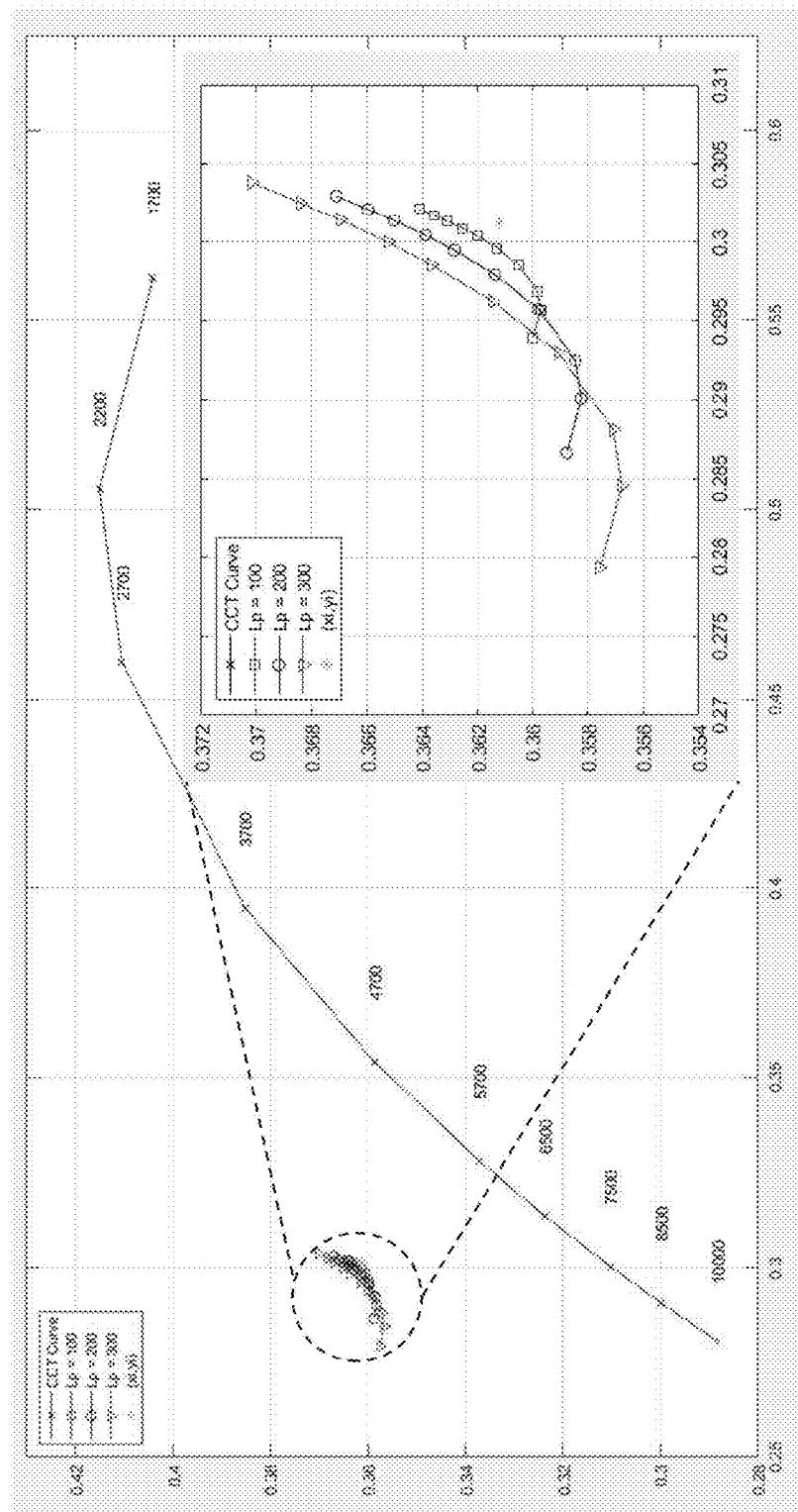
FIG. 8B is a graph illustrating example plots of a modified pixel chromaticity and a close-up view of the plots, in one or more embodiments.

FIG. 8B is a graph 750 illustrating example plots of a modified pixel chromaticity (x'$_I$, y'$_I$) and a close-up view of the plots, in one or more embodiments. A horizontal axis of the graph 750 represents a x-coordinate in chromaticity. A vertical axis of the graph 750 represents a y-coordinate in chromaticity. Assume L$_I$=5 nits, L$_p$ varies from 100 lux to 300 lux with 100 lux intervals, K=0.005, and ambient chromaticity (i.e., ambient CCT) is set to 1700K, 2200K, 2700K, 3700K, 4700K, 5700K, 6500K, 7500K, 8500K, and 10000K, respectively. As shown by the example plots of FIG. 8B, an original pixel chromaticity of an input pixel is shifted to a modified pixel chromaticity (x'$_I$, y'$_I$) (pixel wise color tone modification via the perception model based compensation system 600).

As shown in FIGS. 8A-8B, a smaller scaling factor K (e.g., K=0.0015) results in less white point shifting, whereas a larger scaling factor K (e.g., K=0.005) results in more white point shifting.

Let T generally denote an ambient CCT of a viewing environment that includes a consumer display (e.g., display device 60), let T$_c$ generally denote a compensated CCT resulting from the color tone compensation system 430 modifying content presented on the consumer display, and let T$_r$ generally denote a CCT of a reference monitor (e.g., reference display 370) utilized in a color grading/reference environment in which the content is color graded. In one embodiment, the perception model based compensation system 600 determines a compensated CCT T$_c$ in accordance with equation (13) provided below:

$$T_c = h(T, T_r) \tag{13},$$

wherein h is a mapping function.

After determining a compensated CCT T$_c$, the perception model based compensation system 600 determines ambient chromaticity (x$_p$, y$_p$) (i.e., compensated white point) of the compensated CCT T$_c$, and utilizes the ambient chromaticity (x$_p$, y$_p$) to determine modified pixel chromaticity (x'$_I$, y'$_I$) n accordance with equations (8)-(12) provided above.

If T=T$_r$ (i.e., ambient lighting conditions of a viewing environment and a color grading/reference environment are the same), the mapping function h does not compensate (i.e., T$_c$=h(T$_r$, T$_r$)=T$_r$). In one embodiment, the mapping function h is a quadratic mapping function including one or more parameters. For example, in one embodiment, the perception model based compensation system 600 determines a compensated CCT T$_c$ in accordance with equation (14) provided below:

$$T_c = h(T, T_r) = a(T - T_r)^2 + b(T - T_r) + T_r \tag{14},$$

wherein a and b are parameters of the quadratic mapping function h. In one embodiment, as part of automatic white balancing, the perception model based compensation system 600 is configured to tune one or more parameters of a compensated (i.e., modified) white point of the content (e.g., parameters a and b of the quadratic mapping function h). Assume T$_r$=6500K. If a white point of a display device 60 is D65, content shown on the display device 60 in a viewing environment with ambient light of 6500K matches creative intent. If the white point of the display device 60 is not D65, the content shown on the display device 60 does not match the creative intent even with ambient light of 6500K. In the event the white point of the display device 60 is not D65, the content may be modified via chromatic adaptation using a modified (i.e., compensated) white point T$_r$' to match the creative intent (i.e., the content is perceived the same in the viewing environment and in the color grading environment).

Further, if the ambient light does not match T$_r$ (i.e., the ambient light is not 6500K), the perception model based compensation system 600 determines a modified (i.e., compensated) white point (x'$_I$, y'$_I$) by determining a compensated CCT T$_c$ and obtaining a corresponding ambient chromaticity (x$_p$, y$_p$) which is then moved/shifted from D65 to T$_r$', in accordance with equations (15)-(18) provided below:

$$x'_p = x_p - x_r + x_{p,r}, \tag{15}$$

$$y'_p = y_p - y_r + y_{p,r}, \tag{16}$$

$$x'_I = x_I + \frac{\alpha_L y_I (x_I - x'_p)}{\alpha_L (y_p - y_I) + y'_p}, \text{ and} \tag{17}$$

$$y'_I = \frac{y_I y'_p}{\alpha_L (y'_p - y_I) + y'_p}, \tag{18}$$

wherein (x$_r$, y$_r$) is a chromaticity of T$_r$, (x$_{p,r}$, y$_{p,r}$) is a chromaticity of T$_r$', and (x'$_p$, y'$_p$) is a modified ambient chromaticity.

Figure 9:
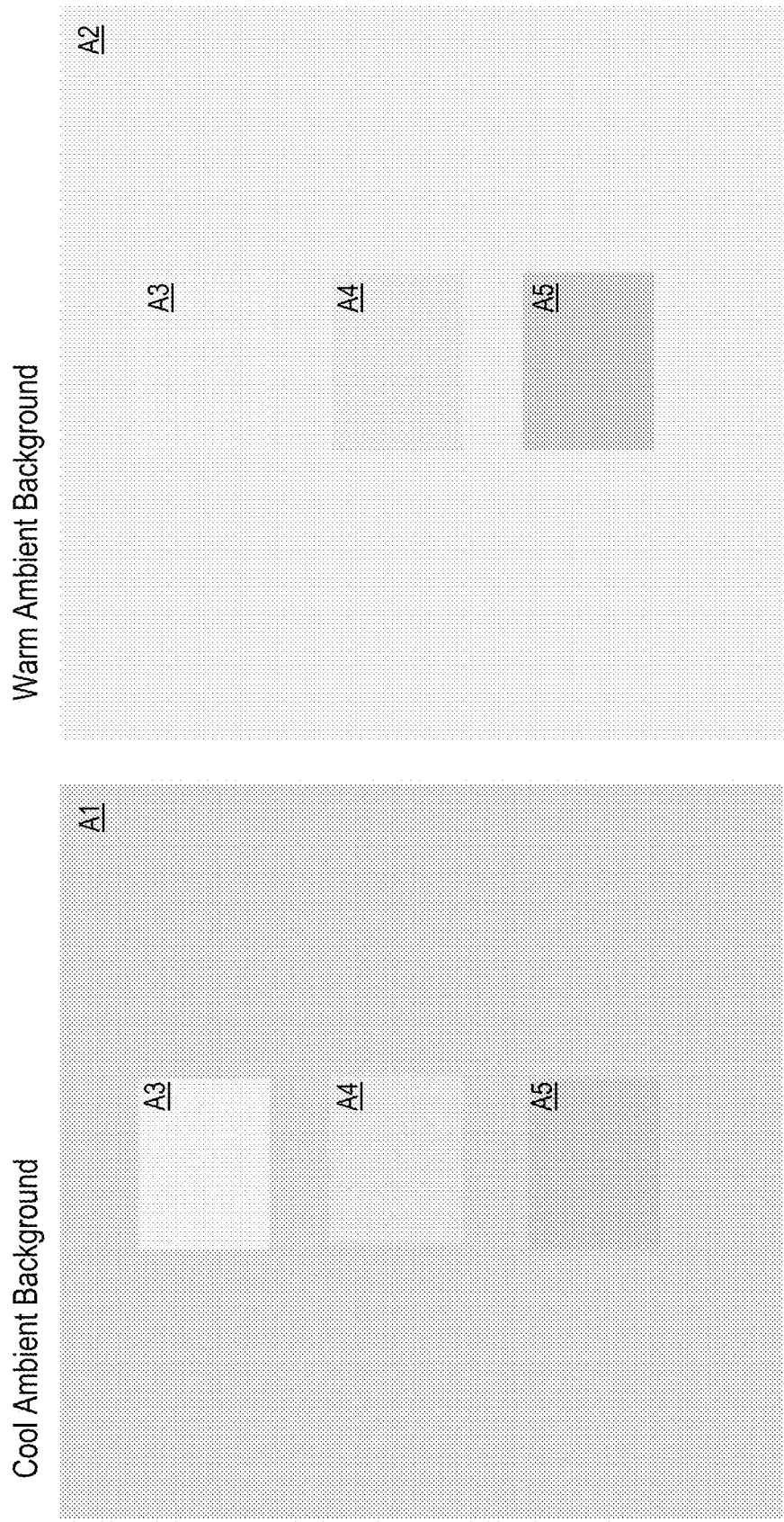
FIG. 9 illustrates differences in perceptual color tone of color patches viewed in a warm ambient and a cool ambient.

FIG. 9 illustrates differences in perceptual color tone of color patches viewed in a warm ambient and a cool ambient. As shown in FIG. 9, three color patches A3, A4, and A5 with different color tones presented against a warm ambient background A2 perceptually look different from the same three color patches A3, A4, and A5 presented against a cool ambient background A1. The system 200 compensates for differences in ambient background.

Figure 10A:
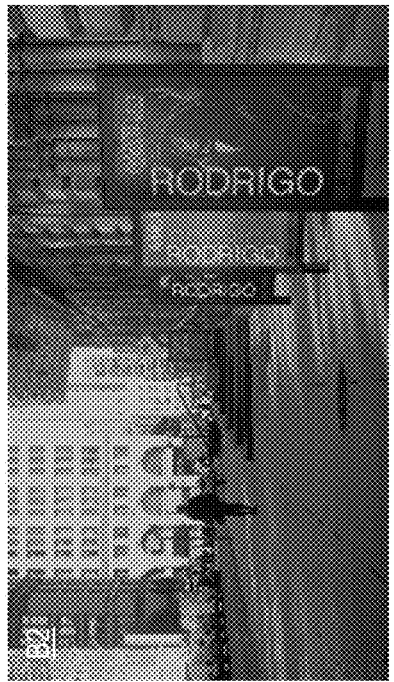
FIG. 10A illustrates differences in perceptual color tone of content presented in different indoor color correlated temperature (CCT) ambient environments.
Figure 10A:
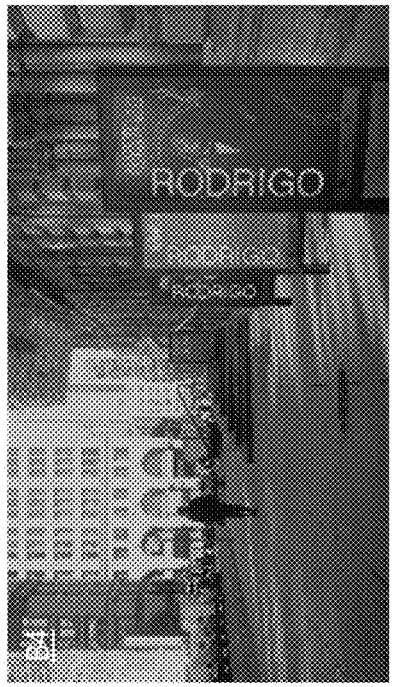
Figure 10A:
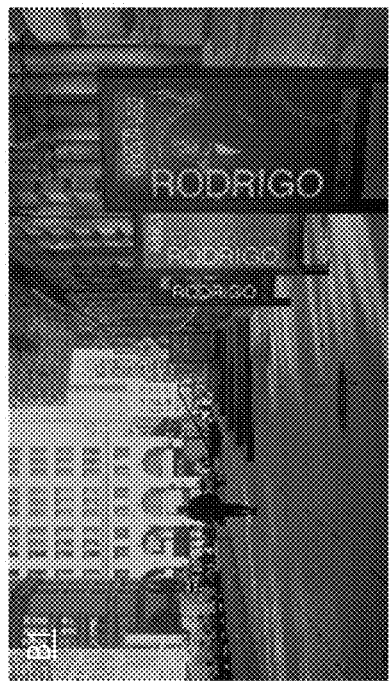
Figure 10A:
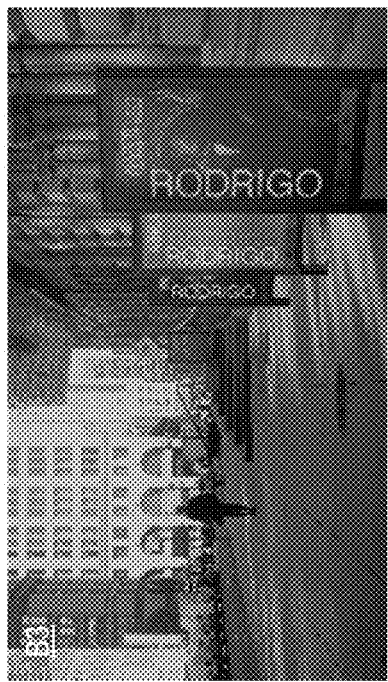

FIG. 10A illustrates differences in perceptual color tone of content presented in different indoor CCT ambient environments. As shown in FIG. 10A, the same image perceptually looks different (i.e., color of the image changes) when presented with different indoor CCT ambient lighting. For example, the same image may perceptually look like B1, B2, B3, and B4 when presented with indoor CCT of 2400K, 4500K, 6500K, and 10000K, respectively. The system 200 compensates for differences in ambient lighting.

Figure 10B:
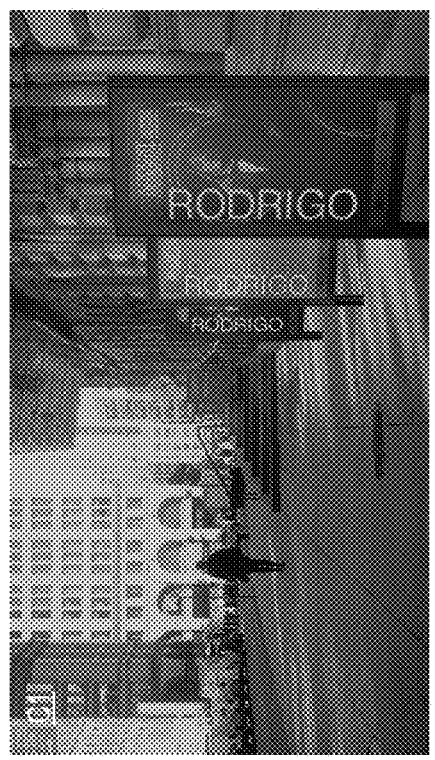
FIG. 10B illustrates different example compensated images resulting from applying perception model based compensation to an input image, in one or more embodiments.
Figure 10B:
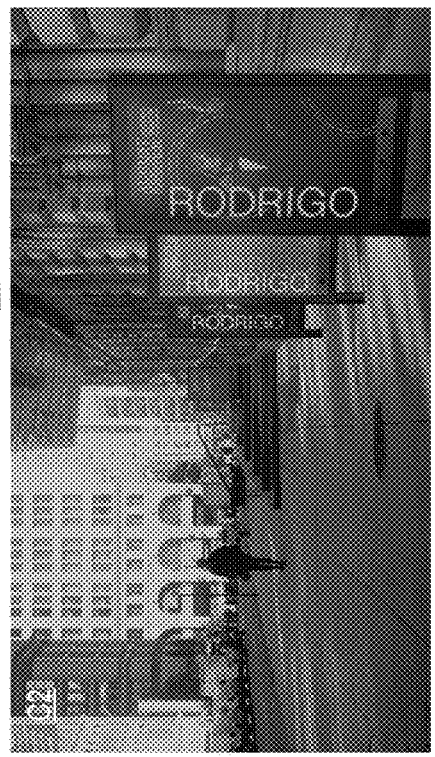
Figure 10B:
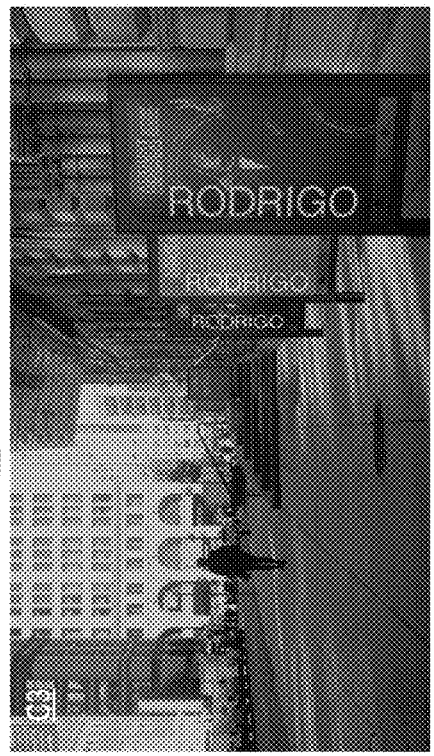

FIG. 10B illustrates different example compensated images resulting from applying perception model based compensation to an input image, in one or more embodiments. The system 200 applies perception model based color compensation (e.g., via the perception model based compensation system 600) to an input image C1, and provides a resulting compensated image as output for presentation on a consumer display (e.g., display device 60). Assume an ambient CCT of a viewing environment that includes the consumer display is 2700K. As shown in FIG. 10B, the system 200 provides as output a compensated image C2 if the scaling factor K=0.01. As further shown in FIG. 10B, the system 200 provides as output a compensated image C3 instead if the scaling factor K=0.03.

Figure 11:
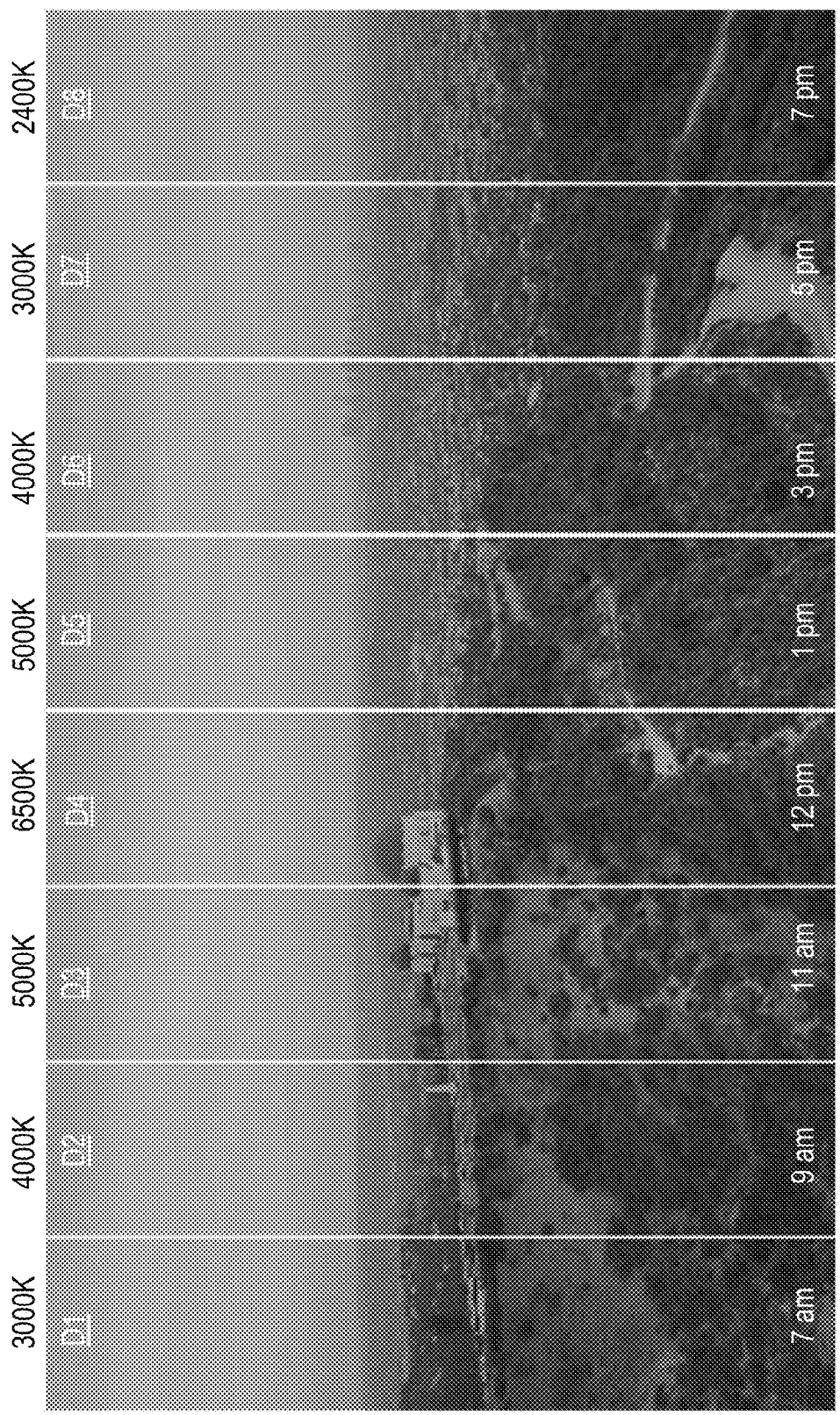
FIG. 11 illustrates differences in perceptual color tone of content presented in different outdoor CCT ambient environments.

FIG. 11 illustrates differences in perceptual color tone of content presented in different outdoor CCT ambient environments. Content may be viewed in a viewing environment under a non-constant viewing condition (i.e., lighting conditions of the viewing environment change over time). For example, a non-constant viewing condition arises when daytime changes to nighttime. As shown in FIG. 11, the same image perceptually looks different (i.e., color of the image changes) under different outdoor CCT ambient lighting. For example, an outdoor scene may perceptually look like D1, D2, D3, D4, D5, D6, D7, and D8 under outdoor CCT of 3000K (e.g., around 7 am), 4000K (e.g., around 9 am), 5000K (e.g., around 11 am), 6500K (e.g., around 12 pm), 5000K (e.g., around 1 pm), 4000K (e.g., around 3 pm), 3000K (e.g., around 5 pm), and 2400K (e.g., around 7 pm), respectively. The system 200 compensates for differences in ambient lighting.

Figure 12:
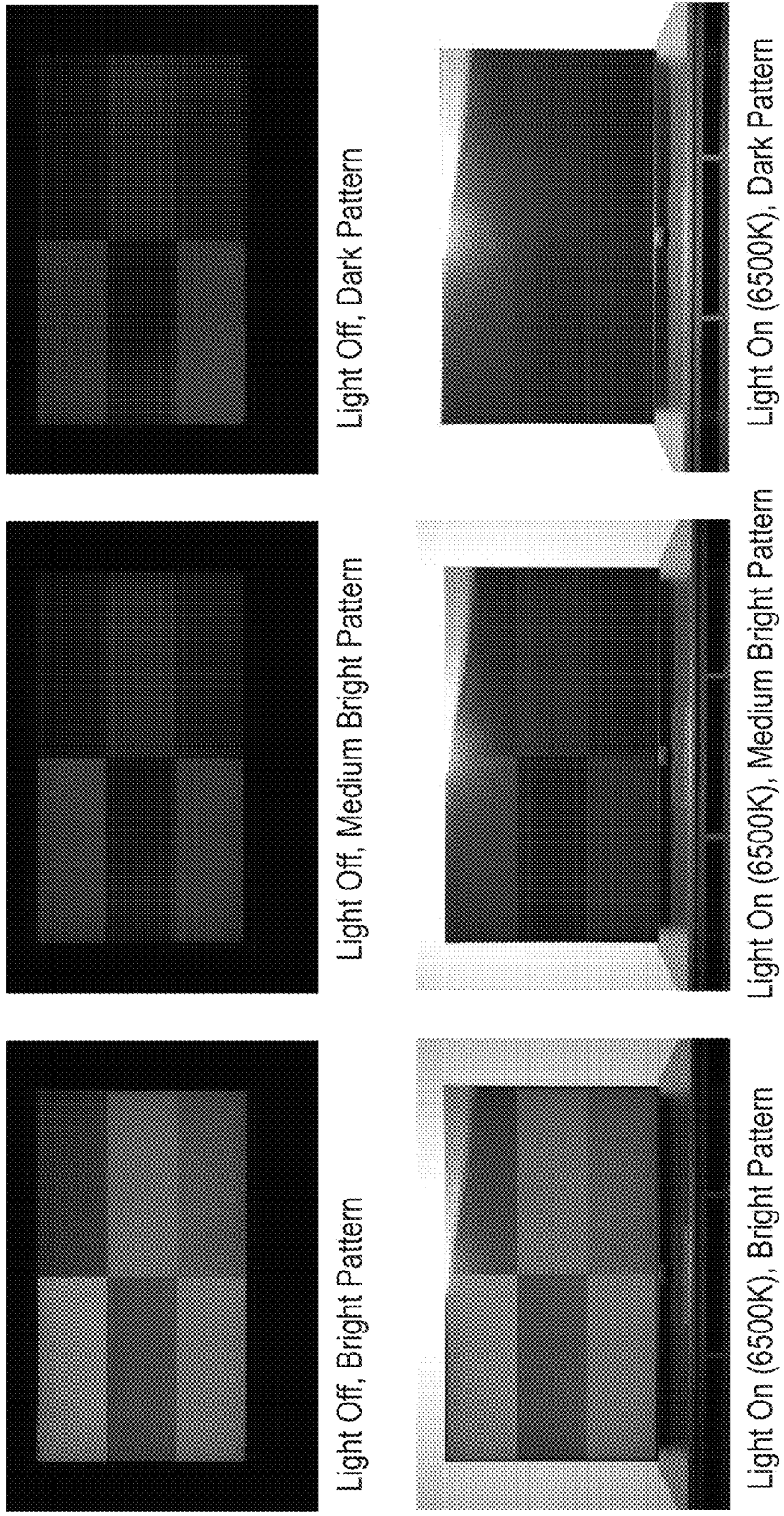
FIG. 12 illustrates differences in perceptual color tone of content presented when ambient lighting is turned on or off.

FIG. 12 illustrates differences in perceptual color tone of content presented when ambient lighting is turned on or off. As shown in FIG. 12, ambient lighting changes the perspective of content in both luminance and color. For example, the same content appears darker with less detail and faded color when ambient lighting is on. Furthermore, different colors of the content are affected by ambient lighting in different ways. For example, higher luminance pixels tend to be less affected by ambient lighting, and vice versa. The system 200 compensates for differences in ambient lighting.

Figure 13:
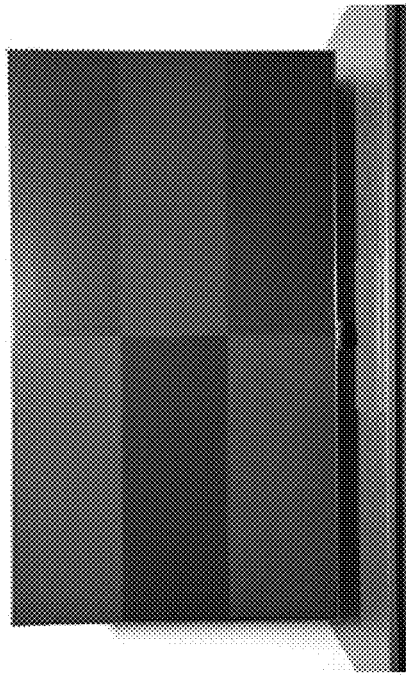
FIG. 13 illustrates differences in perceptual color tone of content presented with different ambient illuminance and CCT.
Figure 13:
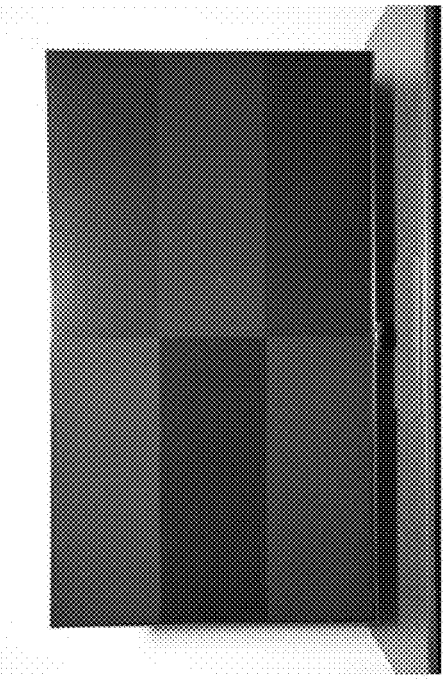
Figure 13:
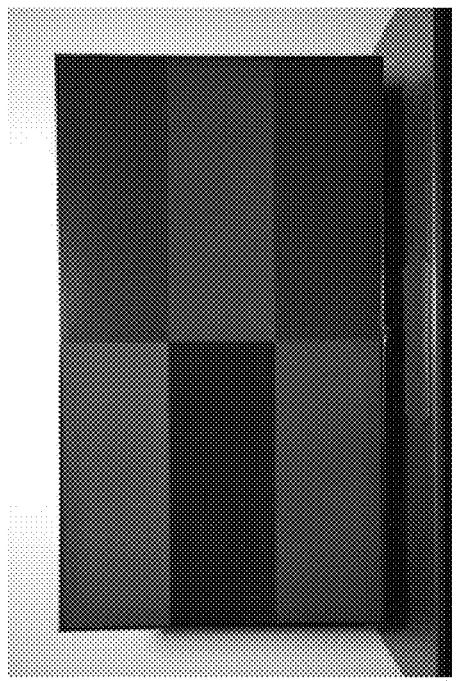
Figure 13:
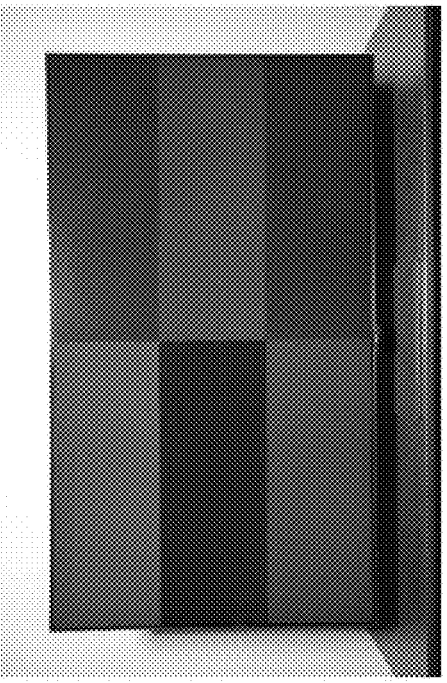

FIG. 13 illustrates differences in perceptual color tone of content presented with different ambient illuminance and CCT. As shown in FIG. 13, different ambient CCT changes the perspective of content differently. For example, warm ambient makes the content look different than cool ambient. As also shown in FIG. 13, stronger ambient affects the content more seriously. High luminance content is more resistant to different ambient CCTs. The system 200 compensates for different ambient illuminance and CCT.

Figure 14:
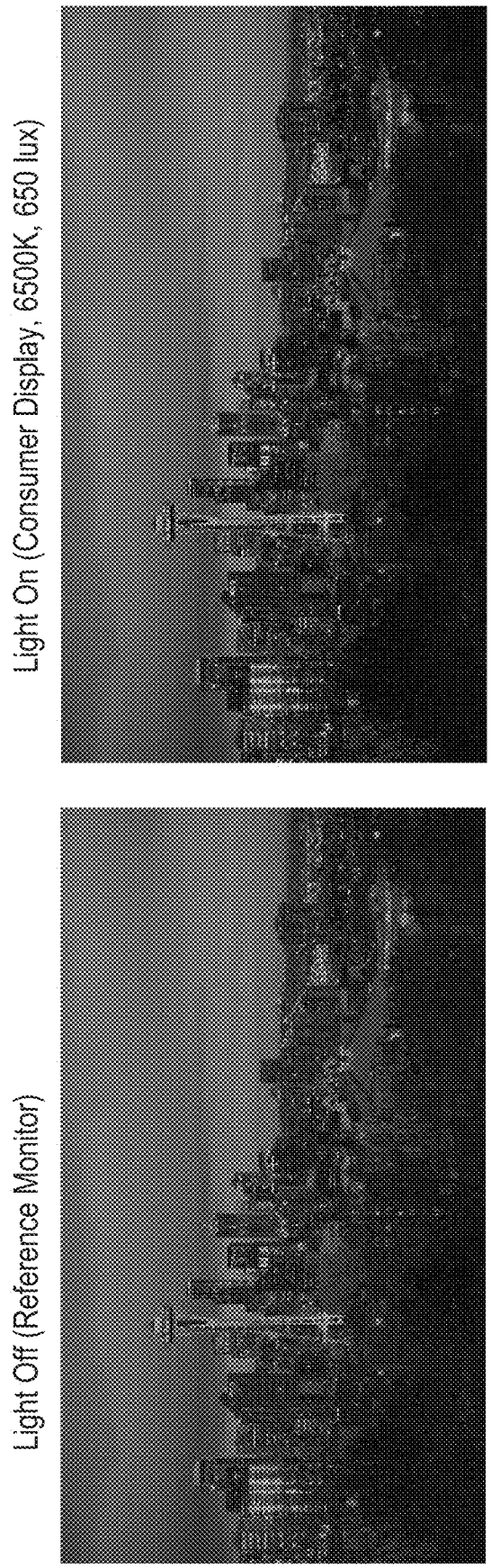
FIG. 14 illustrates visual differences of content presented on a reference monitor and on a consumer display.

FIG. 14 illustrates visual differences of content presented on a reference monitor and on a consumer display. Assume in a color grading environment, an image is viewed on a reference monitor (e.g., a reference display 370) with no ambient lighting. Further assume in a viewing environment at a consumer end, the same image is viewed on a consumer display (e.g., a display device 60) with ambient illuminance of 650 lux and ambient CCT of 6500K. As shown in FIG. 14, the image appears darker on the consumer display due to bright ambient lighting, the image appears to have a cooler color tone on the reference monitor, the image appears less saturated on the reference monitor, and the image appears sharper on the reference monitor. The system 200 compensates for differences in viewing conditions.

Figure 15:
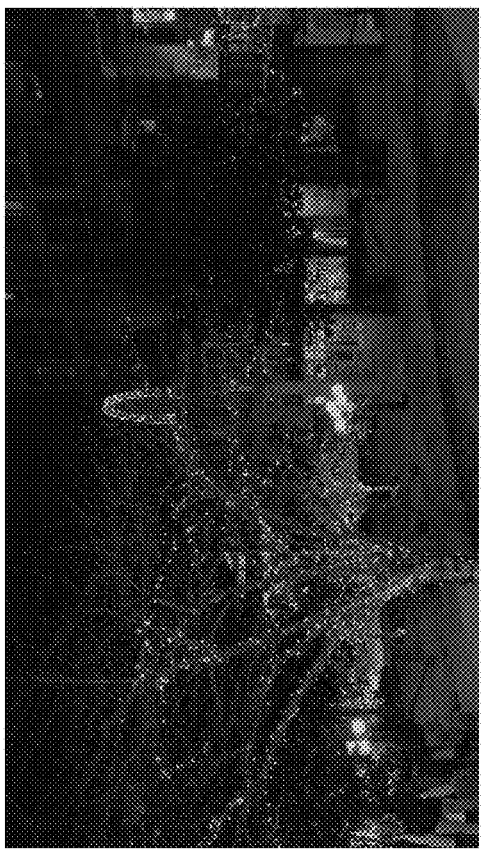
FIG. 15 illustrates visual differences of content presented on a reference monitor and on a consumer display.
Figure 15:

FIG. 15 illustrates visual differences of content presented on a reference monitor and on a consumer display. Assume in a color grading environment, an image is viewed on a reference monitor (e.g., a reference display 370) with no ambient lighting. Further assume in a viewing environment at a consumer end, the same image is viewed on a consumer display (e.g., a display device 60) with ambient illuminance of 650 lux and ambient CCT of 6500K. As shown in FIG. 14, the image appears darker on the consumer display due to bright ambient lighting, the image appears to have a cooler color tone on the reference monitor, the image appears less saturated on the reference monitor, and the image appears sharper on the reference monitor. The system 200 compensates for differences in viewing conditions.

Figure 16:
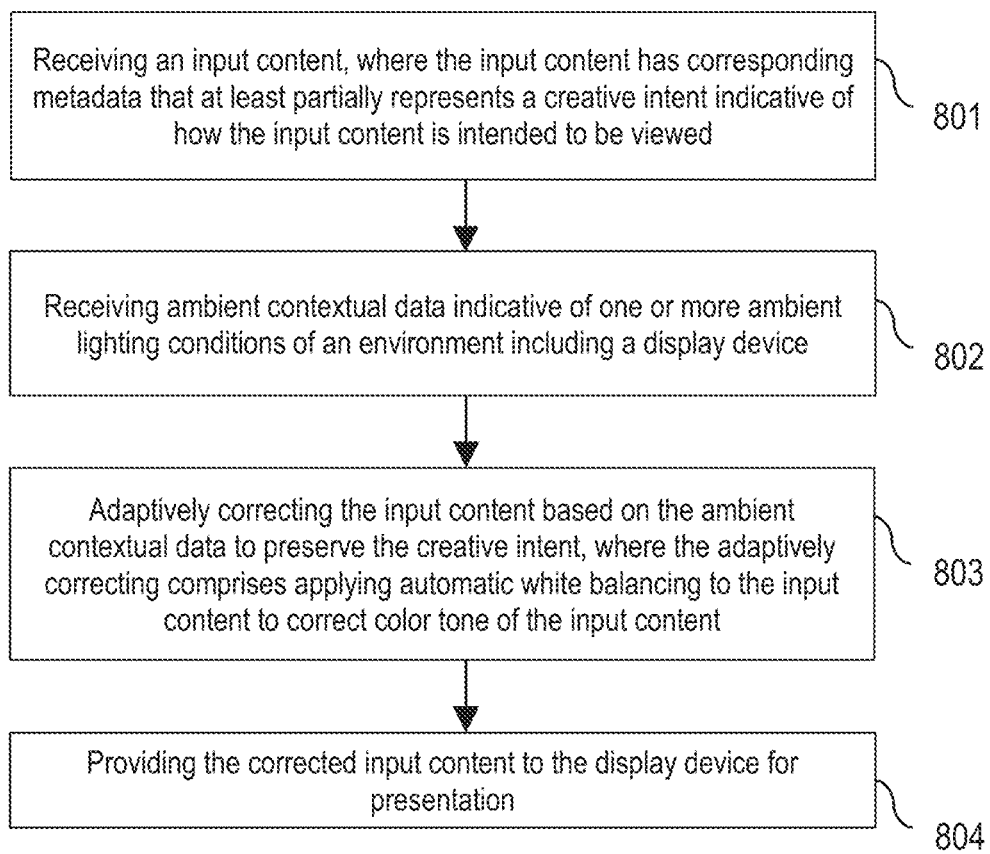
FIG. 16 is a flowchart of an example process for fully automatic color ambient compensation, in one or more embodiments.

FIG. 16 is a flowchart of an example process 800 for fully automatic color ambient compensation, in one or more embodiments. Process block 801 includes receiving an input content, where the input content has corresponding metadata that at least partially represents a creative intent indicative of how the input content is intended to be viewed. Process block 802 includes receiving ambient contextual data indicative of one or more ambient lighting conditions of an environment including a display device. Process block 803 includes adaptively correcting the input content based on the ambient contextual data to preserve the creative intent, where the adaptively correcting comprises applying automatic white balancing to the input content to correct color tone of the input content. Process block 804 includes providing the corrected input content to the display device for presentation.

In one embodiment, process blocks 801-804 may be performed by one or more components of the color ambient compensation system 200.

Figure 17:
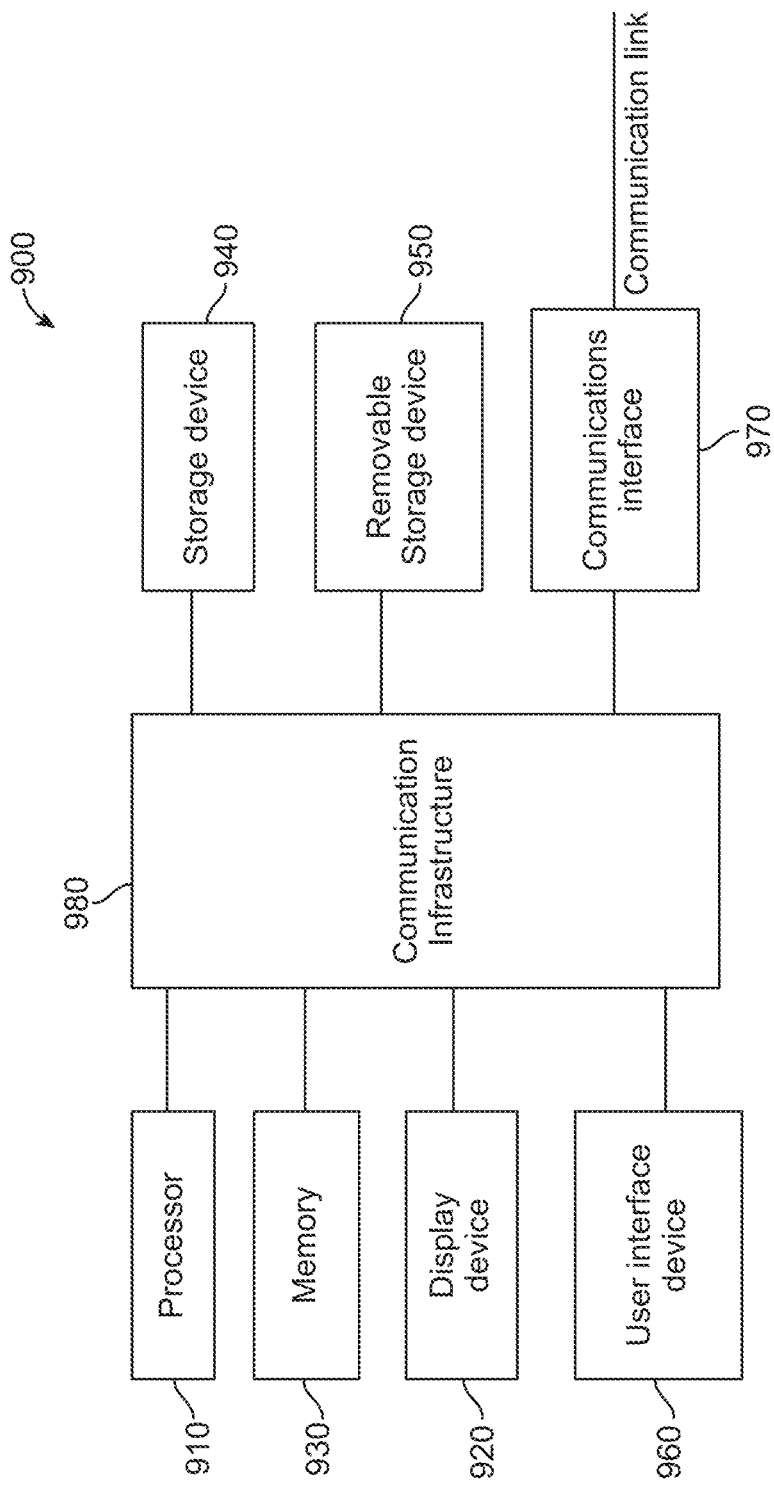
FIG. 17 is a high-level block diagram showing an information processing system comprising a computer system useful for implementing the disclosed embodiments.

FIG. 17 is a high-level block diagram showing an information processing system comprising a computer system 900 useful for implementing the disclosed embodiments. The systems 200, 400, 500, and/or 600 may be incorporated in the computer system 900. The computer system 900 includes one or more processors 910, and can further include an electronic display device 920 (for displaying video, graphics, text, and other data), a main memory 930 (e.g., random access memory (RAM)), storage device 940 (e.g., hard disk drive), removable storage device 950 (e.g., removable storage drive, removable memory module, a magnetic tape drive, optical disk drive, computer readable medium having stored therein computer software and/or data), viewer interface device 960 (e.g., keyboard, touch screen, keypad, pointing device), and a communication interface 970 (e.g., modem, a network interface (such as an Ethernet card), a communications port, or a PCMCIA slot and card). The communication interface 970 allows software and data to be transferred between the computer system and external devices. The system 900 further includes a communications infrastructure 980 (e.g., a communications bus, cross-over bar, or network) to which the aforementioned devices/modules 910 through 970 are connected.

Information transferred via communications interface 970 may be in the form of signals such as electronic, electromagnetic, optical, or other signals capable of being received by communications interface 970, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 800 (FIG. 16) may be stored as program instructions on the memory 930, storage device 940, and/or the removable storage device 950 for execution by the processor 910.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the disclosed technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the disclosed technology.

Though the embodiments have been described with reference to certain versions thereof; however, other versions are possible. Therefore, the spirit and scope of the appended claims should not be limited to the description of the preferred versions contained herein.

What is claimed is:

1. A method comprising:
   receiving an input content, wherein the input content has corresponding metadata that at least partially represents a creative intent indicative of a particular visualization of the input content that a content provider of the input content intends for a viewer to see;
   receiving ambient contextual data indicative of one or more ambient lighting conditions of an environment including a display device;
   adaptively correcting the input content based on the ambient contextual data to preserve the creative intent, wherein the adaptively correcting comprises applying automatic white balancing to the input content to correct color tone of the input content; and
   providing the corrected input content to the display device for presentation.

2. The method of claim 1, wherein the one or more ambient lighting conditions include at least one of an ambient illuminance of the environment or an ambient color correlated temperature (CCT) of the environment.

3. The method of claim 2, wherein the automatic white balancing modifies a white point of the input content using a function based on at least one of the ambient illuminance, the ambient CCT, or a pixel value of the input content.

4. The method of claim 2, wherein the automatic white balancing modifies a white point of the input content using a perceptual color mixing model and a luminance attenuation function that is based on at least one of the ambient illuminance, the ambient CCT, or a neighboring pixel value of the input content.

5. The method of claim 1, wherein the adaptively correcting further comprises adaptively compensating for a black level of the display device.

6. The method of claim 1, wherein the adaptively correcting further comprises adaptively correcting saturation and contrast of the input content.

7. The method of claim 1, wherein the automatic white balancing comprises:
   tuning a first parameter and a second parameter of a quadratic mapping function; and
   modifying a white point of the input content based on the quadratic mapping function to obtain a compensated white point.

8. The method of claim 1, wherein the input content includes at least one of an input image or an input video.

9. A system comprising:
   at least one processor; and
   a non-transitory processor-readable memory device storing instructions that when executed by the at least one processor causes the at least one processor to perform operations including:
   receiving an input content, wherein the input content has corresponding metadata that at least partially represents a creative intent indicative of a particular visualization of the input content that a content provider of the input content intends for a viewer to see;
   receiving ambient contextual data indicative of one or more ambient lighting conditions of an environment including a display device;
   adaptively correcting the input content based on the ambient contextual data to preserve the creative intent, wherein the adaptively correcting comprises applying automatic white balancing to the input content to correct color tone of the input content; and
   providing the corrected input content to the display device for presentation.

10. The system of claim 9, wherein the one or more ambient lighting conditions include at least one of an ambient illuminance of the environment or an ambient color correlated temperature (CCT) of the environment.

11. The system of claim 10, wherein the automatic white balancing modifies a white point of the input content using a function based on at least one of the ambient illuminance, the ambient CCT, or a pixel value of the input content.

12. The system of claim 10, wherein the automatic white balancing modifies a white point of the input content using a perceptual color mixing model and a luminance attenuation function that is based on at least one of the ambient illuminance, the ambient CCT, or a neighboring pixel value of the input content.

13. The system of claim 9, wherein the adaptively correcting further comprises adaptively compensating for a black level of the display device.

14. The system of claim 9, wherein the adaptively correcting further comprises adaptively correcting saturation and contrast of the input content.

15. A non-transitory processor-readable medium that includes a program that when executed by a processor performs a method comprising:
   receiving an input content, wherein the input content has corresponding metadata that at least partially represents a creative intent indicative of a particular visualization of the input content that a content provider of the input content intends for a viewer to see;
   receiving ambient contextual data indicative of one or more ambient lighting conditions of an environment including a display device;
   adaptively correcting the input content based on the ambient contextual data to preserve the creative intent, wherein the adaptively correcting comprises applying automatic white balancing to the input content to correct color tone of the input content; and
   providing the corrected input content to the display device for presentation.

16. The non-transitory processor-readable medium of claim 15, wherein the one or more ambient lighting conditions include at least one of an ambient illuminance of the environment or an ambient color correlated temperature (CCT) of the environment.

17. The non-transitory processor-readable medium of claim 16, wherein the automatic white balancing modifies a white point of the input content using a function based on at least one of the ambient illuminance, the ambient CCT, or a pixel value of the input content.

18. The non-transitory processor-readable medium of claim 16, wherein the automatic white balancing modifies a white point of the input content using a perceptual color mixing model and a luminance attenuation function that is based on at least one of the ambient illuminance, the ambient CCT, or a neighboring pixel value of the input content.

19. The non-transitory processor-readable medium of claim 16, wherein the adaptively correcting further comprises at least one of adaptively compensating for a black level of the display device.

20. The non-transitory processor-readable medium of claim 16, wherein the adaptively correcting further comprises adaptively correcting saturation and contrast of the input content.

* * * * *